US 9,743,655 B2

(12) United States Patent
Hillger et al.

(10) Patent No.: US 9,743,655 B2
(45) Date of Patent: Aug. 29, 2017

(54) SPRAY DRIFT SYSTEMS AND METHODS

(75) Inventors: David E. Hillger, Noblesville, IN (US); Tammie J. Jones-Jefferson, Indianapolis, IN (US); Damon M. Palmer, Pittsboro, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 0 days.

(21) Appl. No.: 13/330,168

(22) Filed: Dec. 19, 2011

(65) Prior Publication Data

US 2012/0168528 A1    Jul. 5, 2012

Related U.S. Application Data

(60) Provisional application No. 61/428,201, filed on Dec. 29, 2010, provisional application No. 61/474,217, filed on Apr. 11, 2011.

(51) Int. Cl.
*A01M 7/00* (2006.01)

(52) U.S. Cl.
CPC .................. *A01M 7/0089* (2013.01)

(58) Field of Classification Search
CPC ...... A01G 29/00; A01G 27/006; A01G 25/02; A01G 25/00; A01C 21/00; B05B 17/04; B05B 1/08; B05B 1/34; A01M 7/0089; F15C 1/22
USPC ........ 239/11, 146, 170, 159; 47/48.5, 58.1 R
See application file for complete search history.

(56) References Cited

U.S. PATENT DOCUMENTS

| 5,343,744 A | 9/1994 | Ammann |
| 5,475,614 A | 12/1995 | Tofte |
| 5,574,657 A | 11/1996 | Tofte |
| 6,013,108 A | 1/2000 | Kapadia |
| 6,321,130 B1 | 11/2001 | Ferenczi et al. |
| 6,402,048 B1 | 6/2002 | Collins |
| 6,424,295 B1 | 7/2002 | Lange |
| 6,726,120 B2 | 4/2004 | Schaffter et al. |
| 6,926,211 B2 | 8/2005 | Bryant et al. |

(Continued)

FOREIGN PATENT DOCUMENTS

| DE | 196 46 219 | 12/1997 |
| DE | 10 2006 012504 | 9/2007 |

(Continued)

OTHER PUBLICATIONS

International Searching Authority, International Search Report and Written Opinion for PCT/US2011/065860, dated May 2012 (14 pages).

(Continued)

*Primary Examiner* — Arthur O Hall
*Assistant Examiner* — Chee-Chong Lee
(74) *Attorney, Agent, or Firm* — Charles W. Arnett; Faegre Baker Daniels LLP

(57) ABSTRACT

Systems and methods for adjusting or providing instructions to spraying systems are provided. In an exemplary embodiment of the present disclosure, a method of adjusting a spraying system is provided. The method comprising: electronically determining a current location of a spraying system; electronically determining a proximity to one or more sensitive areas relative to the current location; and adjusting the spraying system in response to a first one of the one or more sensitive areas being within a first distance from the current location.

31 Claims, 12 Drawing Sheets

(56) References Cited

U.S. PATENT DOCUMENTS

| | | | |
|---|---|---|---|
| 7,142,966 | B2 | 11/2006 | Saller et al. |
| 7,213,772 | B2 | 5/2007 | Bryan et al. |
| 7,292,723 | B2 | 11/2007 | Tedesco et al. |
| 7,388,662 | B2 | 6/2008 | Cantin et al. |
| 8,061,562 | B2 | 11/2011 | Carpenter et al. |
| 8,191,798 | B2 | 6/2012 | Hahn et al. |
| 8,523,085 | B2 | 9/2013 | Grimm et al. |
| 8,583,315 | B2 | 11/2013 | Whitehead et al. |
| 8,634,993 | B2 | 1/2014 | McClure et al. |
| 8,760,303 | B2 | 6/2014 | Hillger et al. |
| 2001/0056516 | A1 | 12/2001 | Schollenberger |
| 2003/0019152 | A1 | 1/2003 | Raun et al. |
| 2003/0111546 | A1 | 6/2003 | Schaffter |
| 2006/0196576 | A1 | 9/2006 | Fleming et al. |
| 2006/0200263 | A1 | 9/2006 | Knight, Jr. et al. |
| 2007/0076202 | A1 | 4/2007 | Cantin et al. |
| 2008/0113868 | A1 | 5/2008 | Moore et al. |
| 2008/0140431 | A1* | 6/2008 | Anderson et al. ............ 705/1 |
| 2009/0050704 | A1 | 2/2009 | Harrison, Jr. |
| 2009/0242657 | A1* | 10/2009 | Peterson ................. 239/11 |
| 2010/0179734 | A1 | 7/2010 | Schumann et al. |
| 2011/0106320 | A1 | 5/2011 | Hall |
| 2011/0160919 | A1 | 6/2011 | Orr et al. |
| 2011/0247264 | A1 | 10/2011 | Luciano, Jr. |
| 2012/0169504 | A1 | 7/2012 | Hillger et al. |
| 2012/0215366 | A1 | 8/2012 | Redmond et al. |
| 2013/0103211 | A1 | 4/2013 | Peterson et al. |
| 2013/0105591 | A1 | 5/2013 | Peterson |
| 2014/0316692 | A1 | 10/2014 | Hillger et al. |

FOREIGN PATENT DOCUMENTS

| | | |
|---|---|---|
| DE | 102006012504 | 9/2007 |
| EP | 0 824 852 | 2/1998 |
| JP | H10243707 | 9/1998 |
| TW | 194768 | 11/1992 |
| TW | 416536 | 12/2000 |
| WO | WO 2005/034622 | 4/2005 |
| WO | WO 2006/113688 | 10/2006 |
| WO | 2007045199 A1 | 4/2007 |
| WO | WO 2012/091988 | 7/2012 |
| WO | WO 2012/091990 | 7/2012 |
| WO | WO 2013/063225 | 5/2013 |

OTHER PUBLICATIONS

International Searching Authority, International Search Report and Written Opinion for PCT/US2011/065857, dated May 2012, (13 pages).
Office of the Indiana State Chemist, "Driftwatch" brochure, as early as 2009 (2 pages).
"H2Ovis, Temik Monitor, Visual Information System," presentation slides, As early as 2010, (10 pages).
Case IH "Patriot Sprayers" brochure CIH6070601, as early as 2007 (16 pages).
Office Action Issued in U.S. Appl. No. 13/330,194, dated Sep. 7, 2013, 8 pages.
Response to Office Action issued in U.S. Appl. No. 13/330,194, filed Oct. 31, 2013, 11 pages.
Communication Pursuant to Rules 161(1) and 162 EPC in European patent application 11809020.8, dated Aug. 6, 2013, 2 pages.
Response to Communication Pursuant to Rules 161(1) and 162 EPC in European patent application 11809020.8, dated Feb. 6, 2014, 8 pages.
Communication Pursuant to Rules 161(1) and 162 EPC in European patent application 11809019.0, dated Aug. 6, 2013, 2 pages.
Response to Communication Pursuant to Rules 161(1) and 162 EPC in European patent application 11809019.0, dated Feb. 6, 2014, 7 pages.
European Search Report in Application No. 11809019.0, dated Apr. 11, 2014, 6 pages.
European Search Report in Application No. 11809020.8, dated Apr. 11, 2014, 6 pages.
Examination Report dated Feb. 3, 2015 from the EPO in related European Patent Application No. 11809020.8.
Office Action dated Apr. 2, 2015 from U.S. Appl. No. 14/282,764.
Amendment filed Aug. 25, 2015 in U.S. Appl. No. 14/282,764.
European Search Report in Application No. 11809020.8, dated Jan. 29, 2016, 5 pages.
Response in European patent application 11809020.8, dated Jun. 3, 2015.
Response in European patent application 11809020.8, dated Sep. 26, 2014.
European Search Report in Application No. 11809019.0 dated Jan. 29, 2016.
Response to Feb. 12, 2015 Exam report in European patent application 11809019.0, dated Jun. 10, 2015.
Examination Report dated Feb. 12, 2015 from the EPO in related European Patent Application No. 11809019.0.
Response in European patent application 11809019.0, dated Oct. 21, 2014.
Response to Office Action issued in U.S. Appl. No. 14/282,764, filed Feb. 25, 2016.
Office Action dated Apr. 13, 2016 in U.S. Appl. No. 14/282,764.
Response to Office Action issued in U.S. Appl. No. 14/282,764, filed Oct. 12, 2016.
Response in European patent application 11809019.0, dated Jul. 28, 2016, 2 pages.
Response in European patent application 11809020.8, dated Jul. 21, 2016, 2 pages.
Search Report in TW Application No. 100149190 dated May 16, 2016, 6 pages.
Response to Office Action in corresponding Taiwanese Patent Application No. 100149190, dated Nov. 15, 2016.
Office Action in corresponding U.S. Appl. No. 14/282,764, dated Dec. 30, 2016.
Office Action dated Oct. 2, 2014 in U.S. Appl. No. 14/282,764.
Office Action dated Aug. 7, 2013 in U.S. Appl. No. 13/330,194.
Response to Office Action Issued in U.S. Appl. No. 14/282,764, filed Mar. 30, 2017, 11 pages.

* cited by examiner

SPRAY DRIFT SYSTEMS AND METHODS

CROSS REFERENCE TO RELATED APPLICATIONS

This application claims priority to U.S. Provisional Patent Application 61/474,217, filed Apr. 11, 2011, and U.S. Provisional Patent Application 61/428,201, filed Dec. 29, 2010, the entire disclosures of which are incorporated by reference. The entire disclosures of U.S. Provisional Patent Application 61/474,222, filed Apr. 11, 2011, and U.S. Provisional Patent Application 61/428,195, filed Dec. 29, 2010, are also incorporated by reference.

FIELD OF THE DISCLOSURE

The present disclosure relates in part to the identification and avoidance of plants and/or animals based upon provided information and in particular to systems and methods for controlling spraying applications based at least on the presence of plants or animals that may be sensitive to a sprayed substance or that may be marketed with a certain property that is inconsistent with the sprayed substance.

BACKGROUND OF THE DISCLOSURE

Certain agricultural crops, animals, or insects may be more sensitive than others to the application of one or more applied substances, and may not be the target of the application. The applied substances may include pesticides, fertilizers, fungicides, other growth promoting or inhibiting compounds, or excessive amounts of water. For example, a colony of honeybees may be sensitive to a pesticide, so that a small amount of airborne pesticide, drifting from one field to another field, may damage or destroy the colony, even if it was released to support crops in an adjacent field. Similarly, a field of tomatoes may be sensitive to one or more pesticides, so that a small amount of the pesticide may damage the tomatoes and reduce the overall output of tomatoes in the field. Further, an at-risk habitat may include plants and animals that are sensitive to one or more applied substances, or an endangered species may be present in a particular area to be protected from further population decreases. In another example, a watershed or drainage basin may be identified, and the application of chemicals near the watershed may be prohibited or undesirable. Additionally, the presence or absence of workers in an area, the presence or absence of nearby population centers, or the presence of homes, businesses, or other industrial areas may also be considered when applying chemicals to fields.

In addition, some crops or animals are marketed having certain properties. An example property is that the crop is organically grown or that the animal is raised on organic food. For these crops, applied substances drifting from an adjacent field may make the crop or animal unsuitable for marketing as having the certain properties, such as organic.

Federal and/or state regulatory bodies maintain a list of requirements for the application of certain substances to fields, and creates "buffer zone" or proximity limit requirements for specific substances. For example, the proximity limit requirements define additional areas surrounding a field where certain substances should not be applied due to proximity to sensitive areas and/or species of animals or plants. Techniques for application of substances which tends to reduce or limit the exposure of people and/or animals to the substances, or additional precautions taken for the application of the substances, may be rewarded with "buffer credits" or drift reduction technology credits as limit reductions. The limit reductions include, but are not limited to, rewards in the form of smaller required buffer zone distances for applications of the same substance, or other rewards for reducing exposure to substances.

Websites are known which permit members of the public to identify areas containing crops or animals that are either sensitive to applied substances or that are being raised for marketing with certain properties. A substance applicator, such as a farmer, a specialized applicator, or pilot, may refer to the website prior to applying a substance, such as a pesticide, to crops in a field. By referring to the website prior to spraying the field the applicator is able to determine the presence, if any, of areas containing crops or animals that are either sensitive to applied substances or that are being raised for marketing with certain properties and to plan the intended spraying accordingly.

SUMMARY

In an exemplary embodiment of the present disclosure, a method of adjusting a spraying system is provided. The method comprising: electronically determining a current location of a spraying system; electronically determining a proximity to one or more sensitive areas relative to the current location; and adjusting the spraying system in response to a first one of the one or more sensitive areas being within a first distance from the current location. In an embodiment, the current location may be determined by Global Positioning System (GPS). In an embodiment, adjusting the spraying system may include one or more of changing a speed of the spraying system, changing a direction of the spraying system, altering a droplet size of the spraying system, or changing a boom height of the spraying system. In an embodiment, the spraying system includes a log file to capture information related to the spraying system, wherein the log file captures one or more of a substance being applied, a date, a current time, the current location of the spraying system, a location of a projected route, an amount of deviation from an actual route to the projected route, actions of a user, information regarding current weather, the location of the one or more sensitive areas, a proximity of the spraying system to the one or more sensitive areas, and a warning. In an embodiment, the spraying system interfaces with a database to determine information related to the one or more sensitive areas. In an embodiment, spraying system interfaces with a third party system to determine additional environmental factors related to the one or more sensitive areas. In an embodiment, the method further comprises providing an indication when a first one of the one or more sensitive areas is within a first distance from the current location, the indication being one of a visual indication, an audio indication, and a tactile indication.

In an exemplary embodiment of the present disclosure, a method of adjusting a spraying system is provided. The method comprising: electronically determining a current location of a spraying system; electronically determining a proximity to one or more sensitive areas relative to the current location; and providing an indication when a first one of the one or more sensitive areas is within a first distance from the current location, the indication being one of a visual indication, an audio indication, and a tactile indication. In an embodiment, the current location may be determined by Global Positioning System (GPS). In an embodiment, adjusting the spraying system may include one or more of changing the speed of the spraying system, changing the direction of the spraying system, altering the droplet size of the spraying system, or changing the boom height of the spraying system. In an embodiment, the spraying system includes a log file to capture information related to the spraying system, wherein the log file captures one or more of a substance being applied, a date, a current time, the current location of the spraying system, a location of a projected route, an amount of deviation from an actual route to the projected route, actions of a user, information regarding current weather, the location of the one or more sensitive areas, a proximity of the spraying system to the one or more sensitive areas, and a warning. In an embodiment, the spraying system interfaces with a database to determine information related to the one or more sensitive areas.

In an exemplary embodiment of the present disclosure, an apparatus for adjusting a spraying system is provided. The apparatus comprising a spraying system to selectively spray one or more substances; and a controller operatively coupled to the spraying system, the controller receiving a current location of the spraying system and information regarding at least a first sensitive area proximate to the spraying system, the controller adjusting an output of the spraying system based on the current location and a separation of the spraying system from the first sensitive area. In an embodiment, the spraying system interfaces with a database to determine information related to the one or more sensitive areas. In an embodiment, the current location may be determined by Global Positioning System (GPS).

In an exemplary embodiment of the present disclosure, a method of providing instructions for a spraying system is provided. The method comprising: receiving input regarding a potential application of one or more substances to locations proximate to one or more sensitive areas; receiving input from a database to determine information related to the one or more sensitive areas; determining instructions for the application of the one or more substances to the locations proximate to the one or more sensitive areas; and generating the instructions for use by a spraying system. In an embodiment, the input regarding a potential application includes at least a temporal identification of a potential application, and the one or more substances to be applied to the locations proximate to the one or more sensitive areas. In an embodiment, the input regarding a potential application includes at least one or more spraying system parameters. In an embodiment, the one or more spraying system parameters includes droplet size, desired pressure, or drift reduction technology credits. In an embodiment, the instructions are electronically provided to the spraying system. In an embodiment, the instructions are provided to a user to operate the spraying system. In an embodiment, the instructions provided to the user to operate the spraying system are transmitted to a handheld device operable by the user. In an embodiment, the spraying system includes a log file to capture information related to the spraying system. In an embodiment, the log file captures deviations from the generated instructions. In an embodiment, the log file is electronically transmitted to a system.

BRIEF DESCRIPTION OF THE DRAWINGS

The detailed description of the drawings particularly refers to the accompanying figures in which.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION OF THE DRAWINGS

The embodiments of the disclosure described herein are not intended to be exhaustive or to limit the disclosure to the precise forms disclosed. Rather, the embodiments selected for description have been chosen to enable one skilled in the art to practice the subject matter of the disclosure. Although the disclosure describes specific configurations of an identification system, it should be understood that the concepts presented herein may be used in other various configurations consistent with this disclosure.

The present disclosure relates in part to the identification and avoidance of plants and/or animals based upon provided information and in particular to systems and methods for controlling spraying applications based at least on the presence of plants or animals that may be sensitive to a sprayed substance or that may be marketed with a certain property that is inconsistent with the sprayed substance.

The present disclosure provides systems and methods for controlling spraying applications based at least on the presence of plants or animals that may be sensitive to a sprayed substance or that may be marketed with a certain property that is inconsistent with the sprayed substance.

"Sensitive area" or "sensitive areas" may include areas where sensitive crops are planted, areas where sensitive crops may be planted in the future, areas where animals that may be sensitive to substances are located or may be located, for example a migratory path or nesting area, watersheds or areas around watersheds, or other areas where any plant, animal, fungi, or bacteria reside or may reside that may be adverse to the application of one or more substances.

Figure 1:
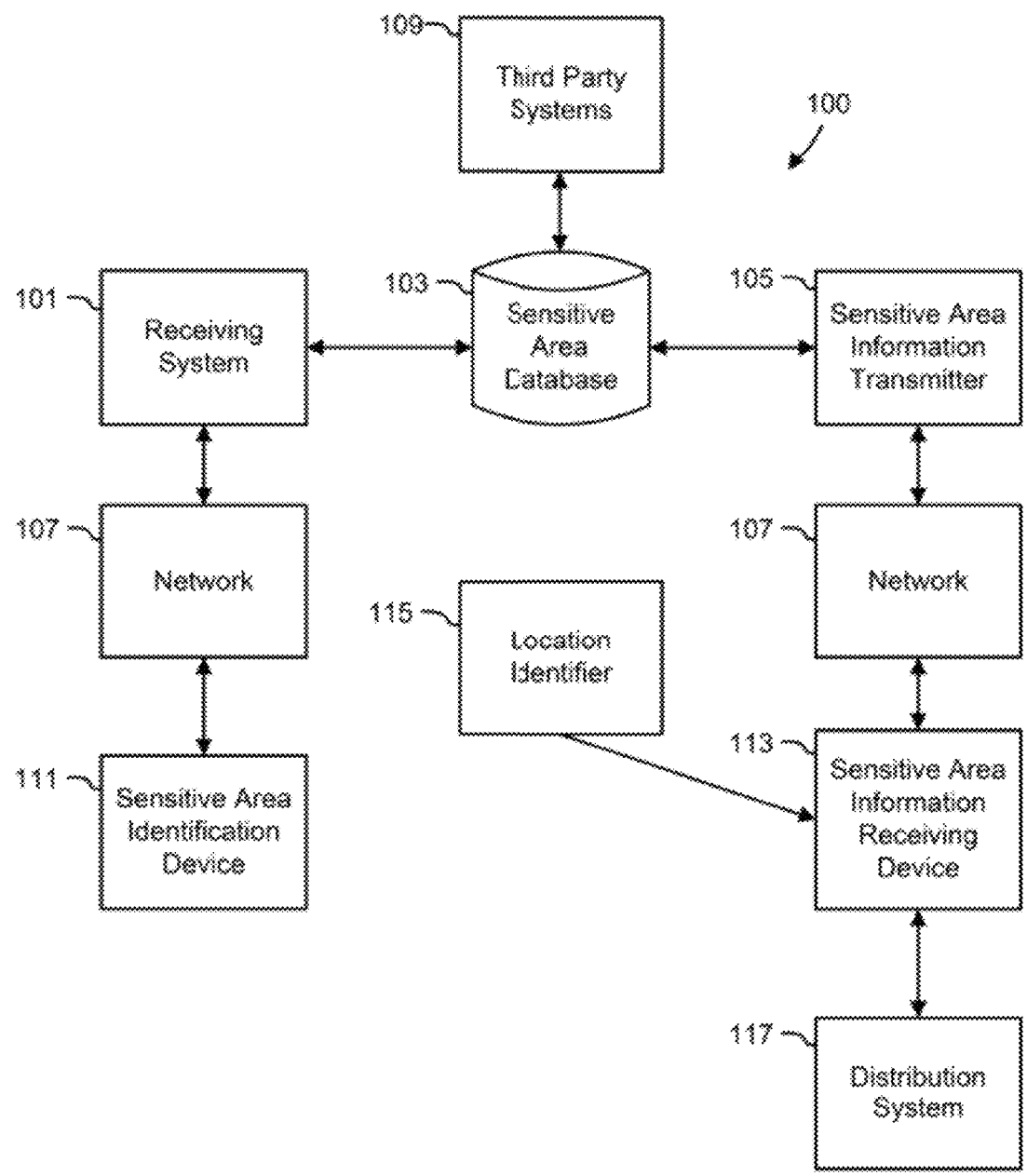
FIG. 1 is a component view of an exemplary identification system according to an embodiment of the present disclosure.

FIG. 1 shows a component view of an exemplary identification system 100 according to an embodiment of the present disclosure. In an exemplary embodiment, the identification system 100 includes one or more sensitive area identification devices 111, one or more networks 107, a receiving system 101, a sensitive area database 103, a sensitive area information transmitter 105, one or more sensitive area information receiving devices 113, and one or more distribution systems 117. In an embodiment, the identification system 100 is also operable to receive information from and/or transmit information to one or more third party systems 109.

The sensitive area identification device 111 is used to identify the location and/or type of sensitive or non-sensitive sensitive areas to be included in the sensitive area database 103, and transmit the identification information to the receiving system 101. In one embodiment, the sensitive area identification device 111 is, for example and without limitation, a smartphone or other electronic device equipped with a global positioning system ("GPS") device used to identify the device's location. Software and/or hardware may be installed on the smartphone to allow the smartphone to capture location information and/or sensitive area location, and transmit the location information and/or sensitive area information to a network 107. The smartphone or other device may be moved around the field containing the sensitive areas, so that GPS data points are recorded, and one or more fields with sensitive or non-sensitive sensitive areas is marked by moving around the boundaries of the field. In one embodiment, the device is operated by a user as a handheld remote device. In another embodiment, the device is installed on machinery such as, for example, a tractor, a sprayer, an all-terrain vehicle, or other suitable vehicles. In another embodiment, the sensitive area identification device 111 is a map available on a computer, and a user may, for example, draw one or more boxes on the map with an input device, or specify locations on the map in other ways. In the embodiment, the sensitive area identification device 111 translates the electronic markings into location information, and transmits the location information to the receiving system 101 via, for example and without limitation, a cellular network or other wireless network. In another embodiment, a user may identify locations on a physical map, and may photograph, scan, or fax the map to the receiving system 101. In another embodiment, a user may describe location information to an operator over a telephone or other device, and the operator may input the location information into the receiving system 101.

The network 107 may include one or more of: a local area network, a wide area network, a radio network such as a radio network using an IEEE 802.11x communications protocol, a cellular network, a satellite network, a cable network, a fiber network or other optical network, a token ring network, or any other kind of packet-switched or direct transmission network may be used. In one embodiment, the network 107 includes the Internet. In another embodiment, the network 107 includes any other type of public or private network. The use of the term "network" does not limit the network to a single style or type of network, or imply that one network is used. A combination of networks of any communications protocol or type may be used. For example, two or more packet-switched networks may be used, or a packet-switched network may be in communication with a radio network.

Figure 2:
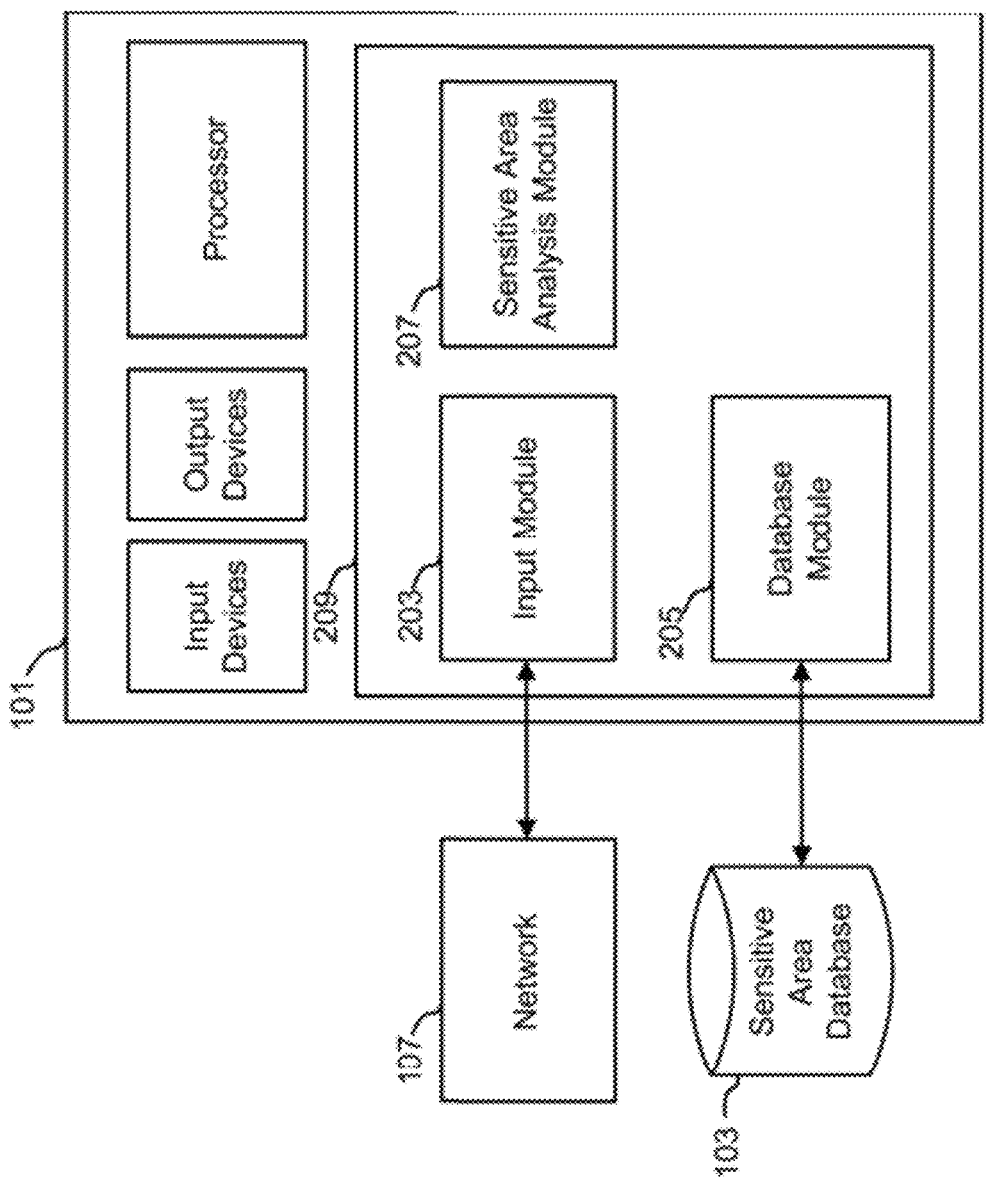
FIG. 2 is a component view of the receiving system of FIG. 1 according to an embodiment of the present disclosure.

The receiving system 101 is described in more detail with reference to FIG. 2. The receiving system 101 receives information provided by the sensitive area identification device 111 and, in an embodiment, rearranges, adds to, or deletes from the data provided by the sensitive area identification device 111 so that the data is in a form to be included in the sensitive area database 103. In an embodiment, the receiving system 101 receives sensitive area information from one or more different types of sensitive area identification devices 111, or one or more other methods of gathering sensitive area information. In an embodiment, the one or more different types of sensitive area identification device 111 each transmit different data structures containing the sensitive area information, so that the receiving system 101 performs one or more different processes on the data received from the one or more sensitive area identification devices 111 so that the data transmitted to the sensitive area database 103 has a uniform data structure, regardless of the data structures transmitted to the receiving system 101 from the one or more sensitive area identification devices 111.

In an embodiment, the receiving system 101 is a separate physical system than the system controlling the sensitive area database 103. In another embodiment, the receiving system 101 and the sensitive area database 103 operate on the same system or systems. In an embodiment, the receiving system 101 may be implemented as one or more processes in software, operating on a hardware platform. In another embodiment, the receiving system 101 is implemented as hardware. As shown with respect to FIG. 2, the receiving system 101 receives an input, performs one or more operations on the input, and generates one or more outputs. In an embodiment, the output is transmitted to the sensitive area database 103. In another embodiment, the output is transmitted to other systems. In an embodiment, the receiving system 101 receives data regarding sensitive area locations from one or more sensitive area identification device 111 via a network 107.

The third party systems 109 may include additional receiving systems 101. For example, a number of receiving systems 101 may receive sensitive area location information from a number of different sensitive area identification devices 111, and transmit the sensitive area location information to the sensitive area database 103. In the embodiment, the different receiving systems 101 may be owned or controlled by different entities, or may be controlled by the same entity for different uses or locations. For example, one receiving system 101 may receive sensitive area location information for one geographical area, and another receiving system 101 may receive sensitive area location information for a different geographical area. In another example, the third party systems 109 includes systems owned or operated by different entities, such as the Environmental Protection Agency, the United States Department of Agriculture, one or more state Departments of Agriculture or similar entities, or other commercial or nonprofit entities. The third party systems 109 may also include information related to additional environmental factors. For example, a third party system 109 may include the real-time location of one or more workers, or the location of workers at specified future times. For example, the third party system 109 may include data regarding the future work schedule of other farmers, or workers for picking produce or performing field maintenance. A third party system 109 may also display aerial hazards, such as the location of wind turbines or areas with flight restrictions. A third party system 109 may also display additional information related to the soil or air characteristics. For example, a third party system 109 may display soil composition characteristics or weather information. In an embodiment, the receiving systems 101 also transmit information received from the sensitive area identification devices to the third party systems. For example, and without limitation, a user may mark a field as containing a sensitive crop, transmitting that information to the receiving system 101. In the embodiment, the receiving system 101 transmits the information regarding the geographical location of the field, the type of crop, and/or time and date information to one or more of the third party systems 109. This transmission may allow the receiving system 101 to share information with the third party systems 109 to enable each of the systems to have similar data.

In one embodiment, receiving system 101 receives sensitive area information from various identification devices 111 and sends that information along to third party systems 109 to update the databases of the third party systems 109. The receiving system 101 may rearrange, add to, or delete from the sensitive area information provided by the identification device 111 to format the data for each respective third party system 109. As such, the receiving system 101 provides a gateway for a user of an identification device 111 to update multiple databases controlled by different entities.

In an embodiment, the third party systems 109 are separate from the sensitive area database 103, and the third party systems 109 and the sensitive area database 103 may communicate via one or more networks 107. In another embodiment, the third party systems 109 operate with the sensitive area database 103, the receiving system 101, and/or the sensitive area information transmitter 105 on the same system or systems. The third party systems 109 may store and recall sensitive area information using a similar data structure as the sensitive area database 103, or the third party systems 109 may store and recall sensitive area information differently than the sensitive area database 103. If the third party systems 109 and the sensitive area database 103 use different data structures, the third party systems 109 may reformat the sensitive area information on the third party systems 109 to become compatible with the data structure of the sensitive area database 103, or the sensitive area database 103 may receive sensitive area information from the third party systems 109, and may reformat the data into the one or more data structures used by the sensitive area database 103 to store and recall sensitive area information. Additionally, in an embodiment, the sensitive area database 103 transmits sensitive area information to the third party systems 109.

Figure 3:
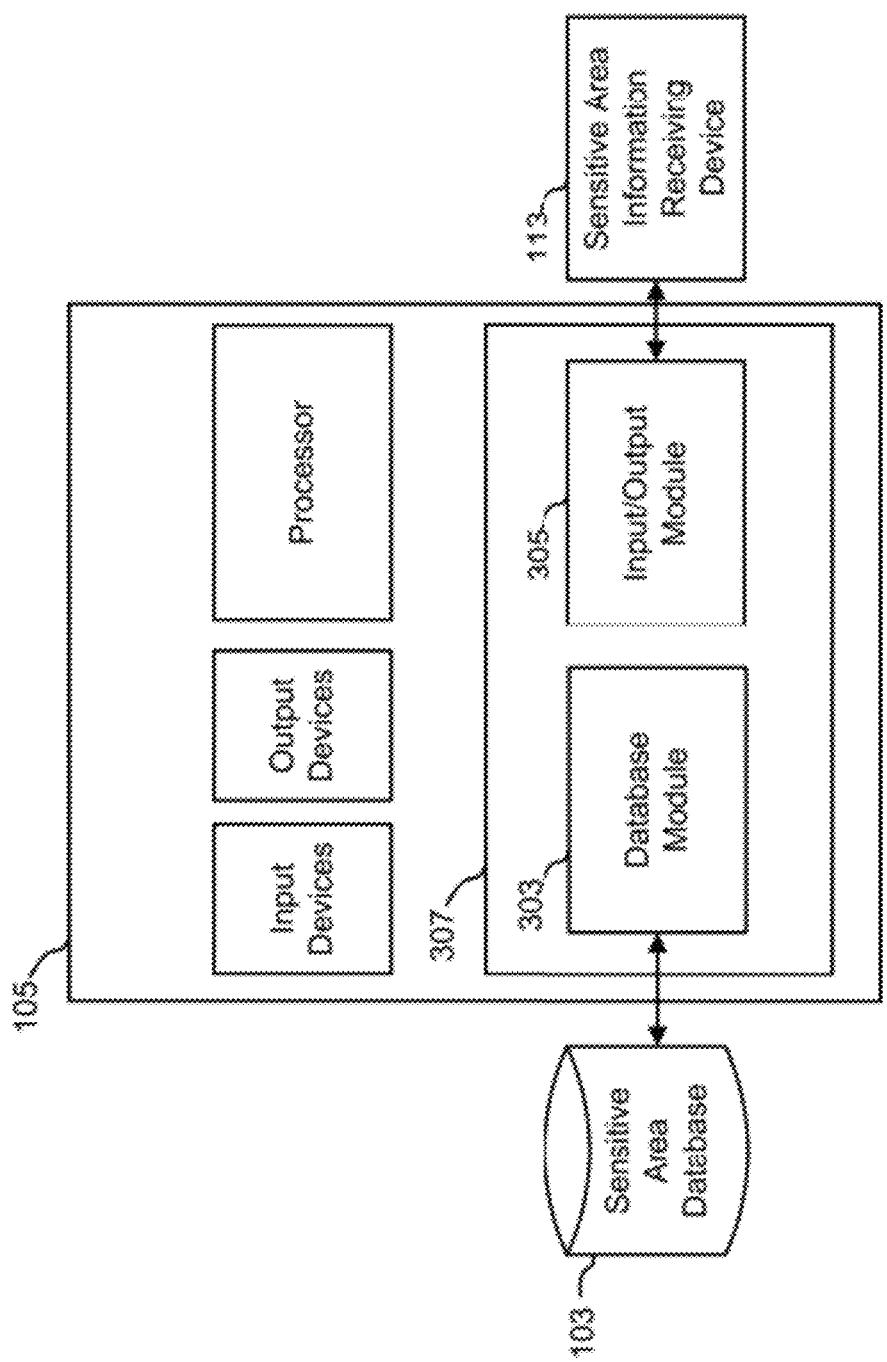
FIG. 3 is a component view of the sensitive area information transmitter of FIG. 1 according to an embodiment of the present disclosure.

The sensitive area database 103 stores and recalls the data provided by the receiving system 101 and/or the third party systems 109. In an embodiment, the sensitive area database 103 uses a relational database to store the data. In another embodiment, the sensitive area database 103 uses other structures to store the data. For example, the sensitive area database 103 may include data stored in a hierarchical data structure, a flat file data structure, or another type of data structure that may allow the storage and recall of data. In another embodiment, the sensitive area database 103 includes data stored on a map, or associated with a map, that is used to determine the location of sensitive areas. In an embodiment, the sensitive area database 103 may be a separate physical system as the receiving system 101 and/or the sensitive area information transmitter 105. In another embodiment, the sensitive area database 103 and the receiving system 101 and/or the sensitive area information transmitter 105 operate on the same physical system or systems. If the sensitive area database 103 is separate from the receiving system 101 and/or the sensitive area information transmitter 105, the sensitive area database 103 may be in communication with the receiving system 101 and/or the sensitive area information transmitter 105 via, for example, one or more networks 107. The sensitive area information transmitter 105 is described in more detail with reference to FIG. 3. The sensitive area information transmitter 105 receives requests for sensitive area information from one or more sensitive area information receiving device 113, and interacts with the sensitive area database 103 to provide the requested information to the sensitive area information receiving device 113. The sensitive area information transmitter 105 may rearrange, add to, or delete from the data provided by the sensitive area database 103 for transmission to the sensitive area information receiving device 113. In an embodiment, the sensitive area information transmitter 105 is a separate physical system than the sensitive area database 103. In another embodiment, the sensitive area information transmitter 105 and the sensitive area database 103 operate on the same system or systems. The sensitive area information transmitter 105 may be implemented as one or more processes in software, operating on a hardware platform, or may be implemented as hardware, or may be implemented as a combination of hardware and software. As shown with respect to FIG. 3, the sensitive area information transmitter 105 receives an input, performs one or more operations on the input, and generates one or more outputs. In an embodiment, the output is be transmitted to the sensitive area information receiving device 113. In another embodiment, the output is transmitted to other systems. In an embodiment, the sensitive area information transmitter 105 transmits data regarding sensitive area information to one or more sensitive area information receiving device 113 via a network 107. One or more different types of sensitive area information receiving devices 113 may request data, and the data that each different type of sensitive area information receiving devices 113 requests may be different. For example, and without limitation, one sensitive area information receiving device 113 may request all of the data in a geographical area from the sensitive area database 103. Another sensitive area information receiving device 113 may request sensitive area information only for a specific type of sensitive area in a specific geographical area. Yet another sensitive area information receiving device 113 may request other types of map data from the sensitive area database 103. The sensitive area information transmitter 115, in one embodiment, is able to correctly provide the requested data, when the requests are different.

The sensitive area information receiving device 113 transmits a request to the sensitive area information transmitter 105, and receives sensitive area information from the sensitive area database 103 via the sensitive area information transmitter 105. The sensitive area information receiving device 113 may be implemented as software or as hardware, and may, in one embodiment, be a smartphone. In another embodiment, the sensitive area information receiving device 113 is attached to or in communication with farm equipment such as, for example and without limitation, a tractor, a sprayer, an all-terrain vehicle, or other suitable vehicles. The communication may be over one or more wired or wireless communication protocols. In an alternate embodiment, the sensitive area information receiving device 113 is a computer that is in communication with the sensitive area information transmitter 105 via, for example and without limitation, one or more networks.

In an embodiment, the user interacts with the sensitive area information receiving device 113, and inputs, for example, date and time or other temporal identification of a potential application, the particular substance or substances that are to be applied, the desired droplet size, the desired pressure, any drift reduction technology ("DRT") credit, and state or federal limitations, and the geographical location of the field for application. In an embodiment, the sensitive area information receiving device 113 may request and receive some inputs from the sensitive area database 103 and/or one or more third party systems 109, such as, for example, DRT credits or state or federal limitations for a substance. The sensitive area information receiving device 113 interacts with the sensitive area information transmitter, and compiles a list of instructions for the user to follow. The instructions may include, but are not limited to, an approval or disapproval of the date and time of the potential application, one or more routes to take through the field, flow parameters for the distribution system 117, including flow rate and/or speed, the location of sensitive crops or other areas around the application site, and/or additional weather information. The sensitive area information receiving device 113 may provide the information to the user via a printout, or may upload information to another device that the user may bring and refer to while completing the application, such as a smartphone, a tablet computer, a laptop computer, or a netbook. In another embodiment, the computer may provide information to a removable storage device, which may interface with a computer or system associated with the distribution system 117. The computer or the sensitive area information transmitter 105 may send further updates to the user, via, for example and without limitation, e-mail, text message, phone call, or other mechanisms to alert a user to a change in the instructions. For example, the computer or the sensitive area information transmitter 105 may send updates to the user to account for changing wind patterns, temperature differences, or other variables not understood at the time the report was printed or transferred to another computer.

The sensitive area information receiving device 113 implements hardware and/or software to calculate or receive a location from a location identifier 115 such as, for example, a GPS receiver to receive location signals from a GPS system. In another embodiment, the sensitive area information receiving device 113 uses one or more internal devices to calculate its location. For example, the sensitive area information receiving device 113 may contain a compass or an inertial guidance system to determine location. In another example, the sensitive area information receiving device 113 includes a device or sensor to measure linear distance. In another example, the sensitive area information receiving device 113 includes one or more accelerometers and/or gyroscopes to determine location or movement from a location. In one embodiment, the sensitive area information receiving device 113 is in communication with one or more distribution systems 117, and transmits sensitive area information to the distribution system 117.

The sensitive area information receiving device 113 may be separate from the distribution systems 117, or may be in the same location as the distribution systems 117. In an embodiment, the sensitive area information receiving device 113 also notes the location of the distribution systems 117, and/or notes the orientation of the sprayers in the distribution systems 117. In one embodiment, the sensitive area information receiving device 113 includes one or more displays, to display the sensitive area location information to a user, or includes other visual, auditory, or tactile devices to convey sensitive area location information. In an embodiment, the sensitive area information receiving device 113 includes additional software and/or hardware that operate to display the received sensitive area information. For example, and without limitation, the sensitive area information receiving device 113 may include a pre-loaded map or satellite images, and the sensitive area information may include location information, which the sensitive area information receiving device 113 overlays on the pre-loaded map. In another embodiment, the map or satellite images are retrieved from a server across the network 107.

In one embodiment, the sensitive area information receiving device 113 is portable or is attached to the distribution system 117. In the embodiment, the sensitive area information receiving device 113 includes a touch-sensitive screen or other touch sensitive area associated with a screen. In another embodiment, the sensitive area information receiving device 113 includes a keyboard, mouse, or one or more additional input devices to input data, and one or more displays to visualize data. Additionally, the sensitive area information receiving device 113 may include one or more speakers or other devices for auditory or tactile outputs.

In one embodiment, the sensitive area information receiving device 113 receives location information and is capable of operating the distribution system 117. The operation may include directly issuing commands to the distribution system 117 to control speed, direction, rate of flow, sprayer operations, or other operations of the distribution system 117. The sensitive area information receiving device 113 may also receive information from the distribution system 117, regarding data such as speed, direction, rate of flow, sprayer operations, or other operations. In one embodiment, the sensitive area information receiving device 113 communicates with the distribution system 117 over a cable or other communication device directly connecting the sensitive area information receiving device 113 and the distribution system 117. In another embodiment, the sensitive area information receiving device 113 communicates with the distribution system 117 via one or more wireless communication protocols, such as, for example and without limitation, one or more IEEE 802.11x protocols, Bluetooth protocols, or a cellular or satellite connection. The sensitive area information receiving device 113 and the distribution system 117 may be in two-way communication, so that the sensitive area information receiving device 113 both communicates information to and receives information from the distribution system 117, or the sensitive area information receiving device 113 may be in one-way communication, so that either the sensitive area information receiving device 113 issues commands to the distribution system 117, but does not receive information from the distribution system 117, or the sensitive area information receiving device 113 receives information from the distribution system 117, but does not send information to the distribution system 117.

The user may correct the sensitive area information receiving device 113 if an error is detected, or may take control of the distribution system 117 in the event of an emergency or to complete other tasks. In other embodiments, the sensitive area information receiving device 113 may present information to the user in the form of visual, auditory, or tactile stimulation, for example an alert, a flashing light or indicator on a screen, heads-up display, or two or three dimensional model or overlay, an audible tone or verbal warning, or a tactile vibration, to alert a user that the distribution system is inside or outside of the bounds of the instructions.

Figure 10:
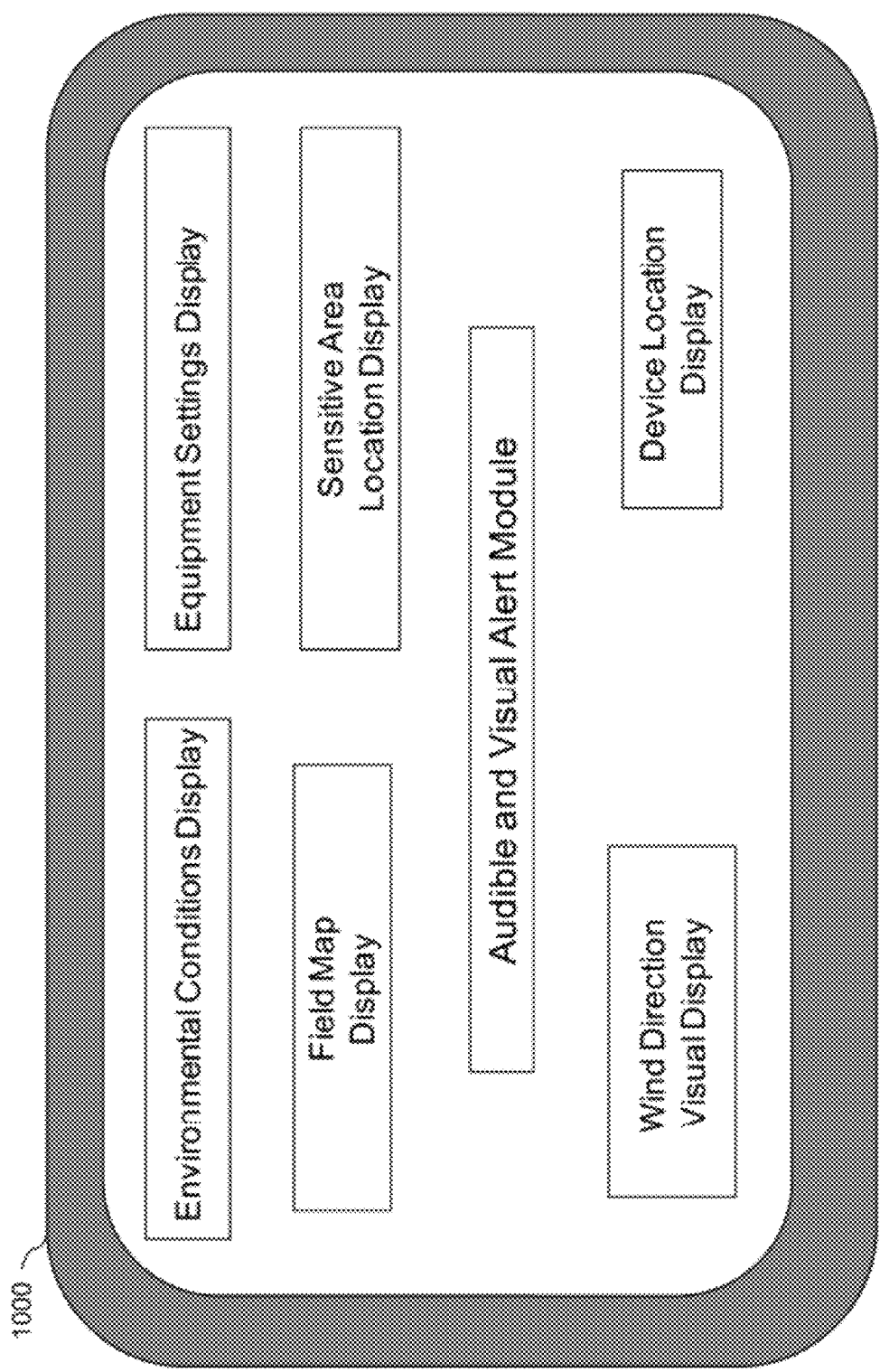
FIG. 10 is an exemplary view of a screen of an sensitive area information receiving device according to an embodiment of the present disclosure.

FIG. 10 shows an exemplary view of a screen 1000 of a sensitive area information receiving device according to an embodiment of the present disclosure. FIG. 10 is an example of an introductory screen, where the user may select information to be displayed. The user may touch one or more of the areas of the screen, if the sensitive area information receiving device 113 is equipped with a touch screen, or may select one or more of the areas with a mouse or a keyboard shortcut, if the sensitive area information receiving device 113 is so equipped. The user may select, for example, to display environmental conditions in the "Environmental Conditions Display," including humidity, temperature, a Doppler representation of the current weather, future weather forecasts, and/or other weather conditions. The user may select the "Equipment Settings Display" to display current or projected settings from the distribution system 117, for example, boom height, spray characteristics, product currently loaded, speed, direction, or other settings related to the operation of the distribution system 117. The user may select the "Field Map Display" to display characteristics of the field for application, to select a new field, or to select other field display options. The user may select the "Sensitive Area Location Display" to display certain sensitive areas, to display information related to one or more of the sensitive areas, or to display sensitive areas in one or more geographical areas. The user may select the "Audible and Visual Alert Module" to select one or more manners of alert, including visual, auditory, or tactile. The user may select the "Wind Direction Visual Display" to selectively display the wind speed and/or direction. The user may select the "Device Location Display" to show the location of the sensitive area information receiving device 113 and/or the distribution system 117 on the field. The user may select one or more display options, and the information related by the options may be overlaid upon one another. In an example, the user elects to display a satellite or aerial image view of the field, and elects to show the geographical boundaries of sensitive areas for crops. The information for the geographical boundaries is overlaid on the satellite view. The user may toggle additional information to be overlaid on the display, so that the user may, for example, toggle the display of soil conditions or the display of current weather conditions on the display. The user may toggle additional information to show as much, or as little, information as the user desires or is necessary or useful to complete a task.

Figure 11:
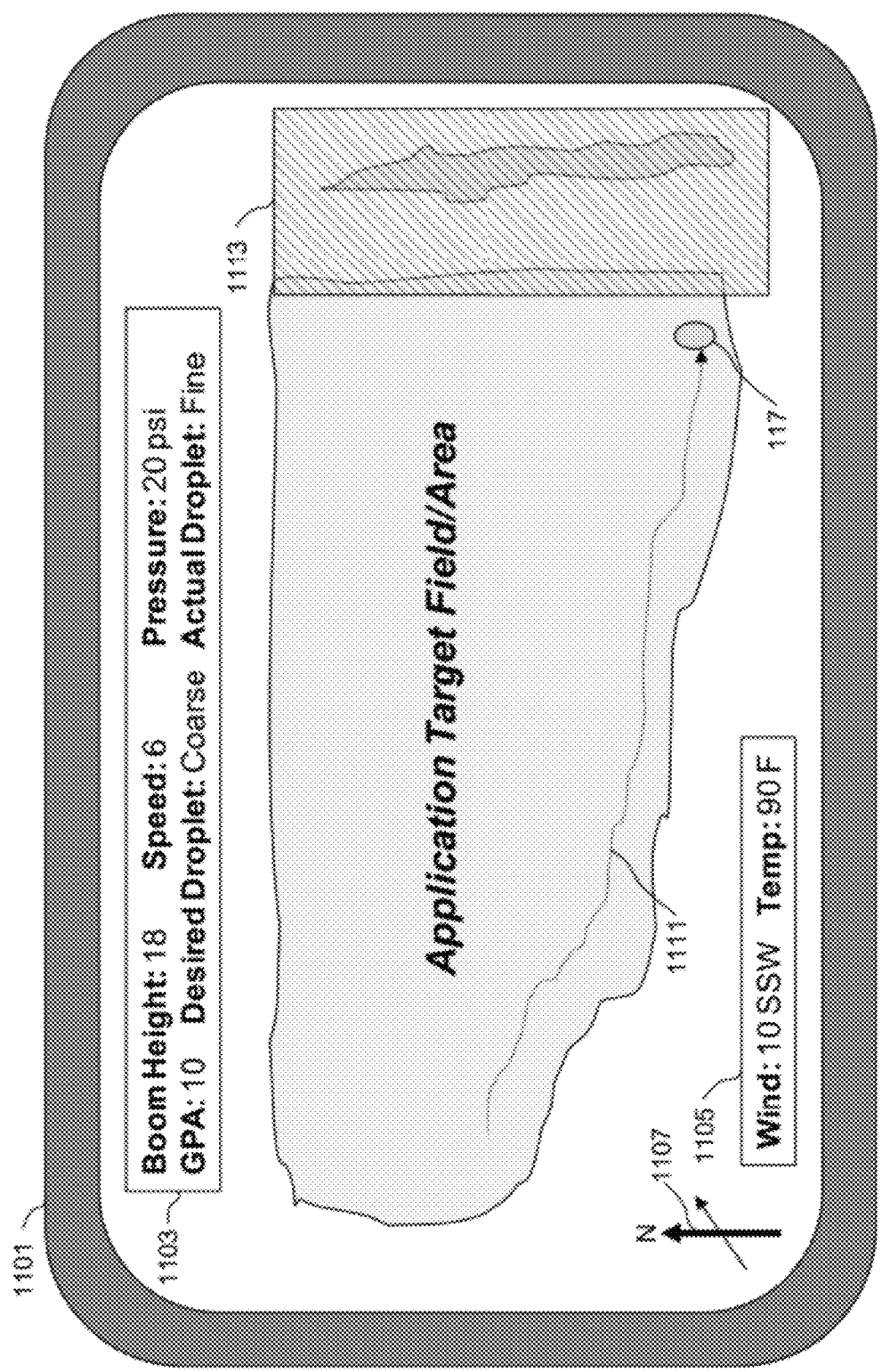
FIG. 11 is an exemplary view of a display screen of a sensitive area information receiving device according to an embodiment of the present disclosure.

FIG. 11 shows an exemplary view of a display screen 1101 of a sensitive area information receiving device 113 according to an embodiment of the present disclosure. In the example provided in FIG. 11, the distribution system 117 has travelled from a beginning point along a line 1111 to a current location, represented by an oval or other marker. In the embodiment, the sensitive area information receiving device 113 tracks the distribution system 117 and displays the historical locations as well as the current location. The sensitive area information receiving device 113 also displays information in box 1103 including boom height, speed, spray pressure, gallons per acre ("GPA"), a desired droplet size as calculated by the sensitive area information receiving device 113, and an actual droplet size that the user has selected or that the distribution system 117 is currently using. The sensitive area information receiving device 113 may also display a direction, indicated by direction marker 1107, and another box 1105 including current weather conditions. Box 1105 may include, but is not limited to, wind direction and speed, and current temperature. The sensitive area information receiving device 113 may also display one or more sensitive area zones 1113. In an embodiment, the sensitive area zones 1113 may expand or contract, or may change shape, depending on the current weather conditions and/or the current conditions of the distribution system 117 and/or other current conditions. For example, if the distribution system 117 changes from a coarse to a fine droplet size, the sensitive area zone 1113 may expand, as the potential drift of the droplets may be increased. The sensitive area information receiving device 113 may also recommend changes based on other environmental factors, such as wind speed, temperature, soil conditions, or other information received by a third party system 109 or sensors on the distribution system 117 or sensors that convey information at or near the distribution system 117. In the embodiment, the sensitive area zones 1113 may not indicate the geographical location of sensitive areas, but instead may indicate areas where the user must alter spray patterns or other aspects of the distribution system 117 in order to avoid drift into the sensitive areas. The geographical boundaries of sensitive areas may be separately displayed, so that the geographical boundaries of the sensitive areas and the sensitive area zones 1113 may be overlaid on one another. In the embodiment, the user may select one of the sensitive areas or the sensitive area zones 1113 to display, or may display both. In another embodiment, the sensitive area zones 1113 may indicate the location of sensitive areas, and so may not change according to current weather conditions and/or the current conditions of the distribution system 117.

Figure 12:
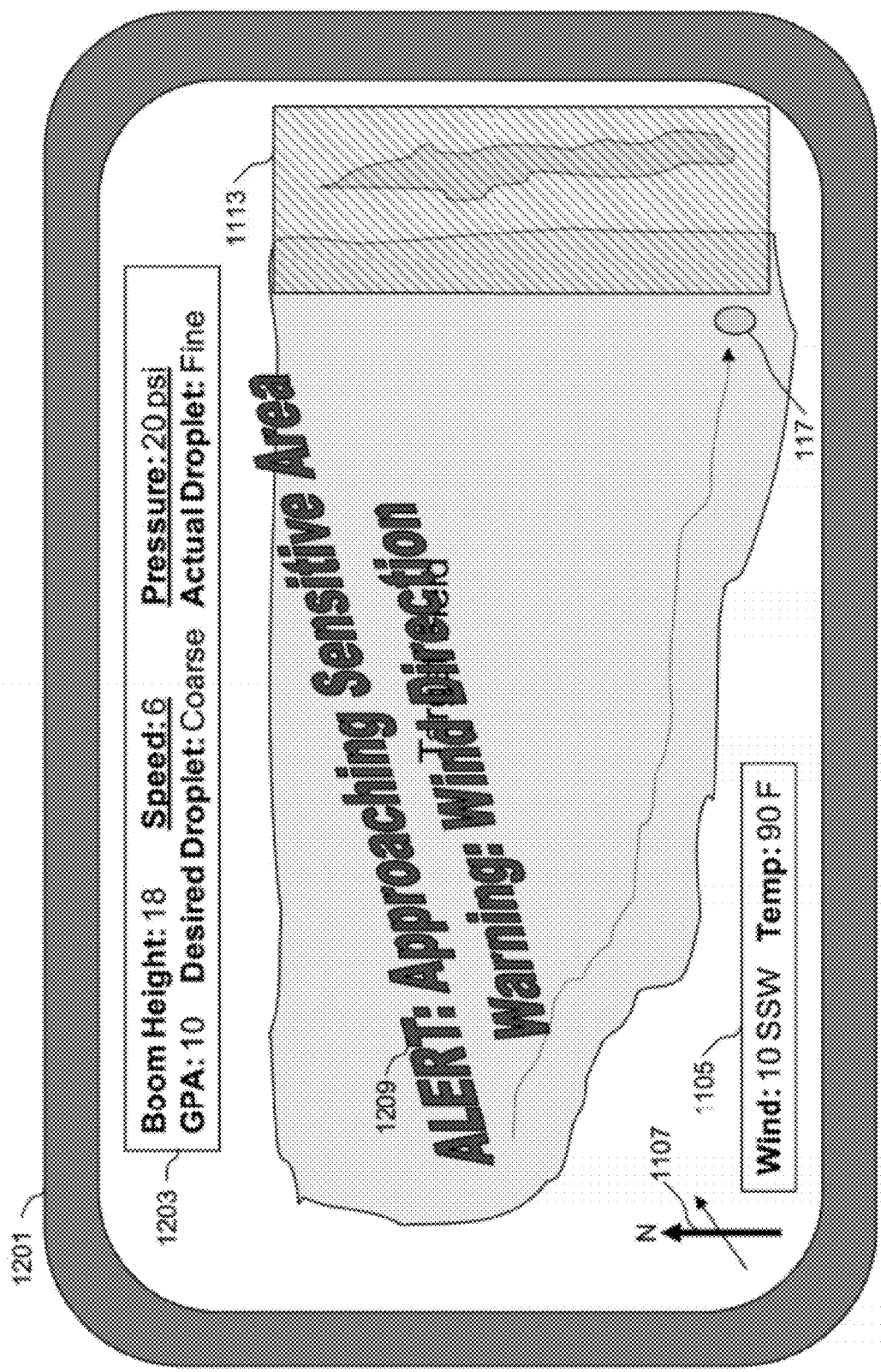
FIG. 12 is an exemplary alert screen for a sensitive area information receiving device according to an embodiment of the present disclosure.

FIG. 12 shows an exemplary alert screen 1201 for a sensitive area information receiving device 113 according to an embodiment of the present disclosure. In the example screen shown in FIG. 12, the sensitive area information receiving device 113 indicates that the distribution system is approaching a sensitive area, and the user is advised to take remedial action to prevent the distribution system 117 from applying product to a sensitive area, or to allow the product to drift into the sensitive area. The screen 1201 shows the current location of the distribution system 117, and also shows the weather condition box 1105, the direction marker 1107, and the sensitive area 1113, but also includes an alert message 1209. The alert message 1209, in the embodiment, includes an indicator of the type of alert an analysis of the conditions that have generated the alert. In the example, the alert is that the distribution system 117 is approaching a sensitive area, and that the wind direction may present a drift hazard, such that the applied product may drift into the sensitive area. The box 1203, in the embodiment, includes a highlight of factors that the sensitive area information receiving device 113 calculates could be changed to fix or abate the alert. In another embodiment, the alert message 1209 may also include additional instructions to take one or more actions. The user may take corrective action to avoid the sensitive area.

The location identifier 115, in some embodiments, assists the sensitive area information receiving device 113 and/or the sensitive area identification device 111 in determining location. The location identifier 115 may be, for example and without limitation, a global positioning system device, one or more transmitters or receivers to determine an approximate location, such as by radio triangulation, astronomical location, or other methods to determine an approximate point of location. In an embodiment, the location identifier 115 also includes other global positioning satellite systems, or may use one or more global navigation satellite systems and/or other methods of location identification to refine or augment location information. In an embodiment, the location identifier 115 uses two or more of the exemplary devices listed above to determine location.

Figure 8:
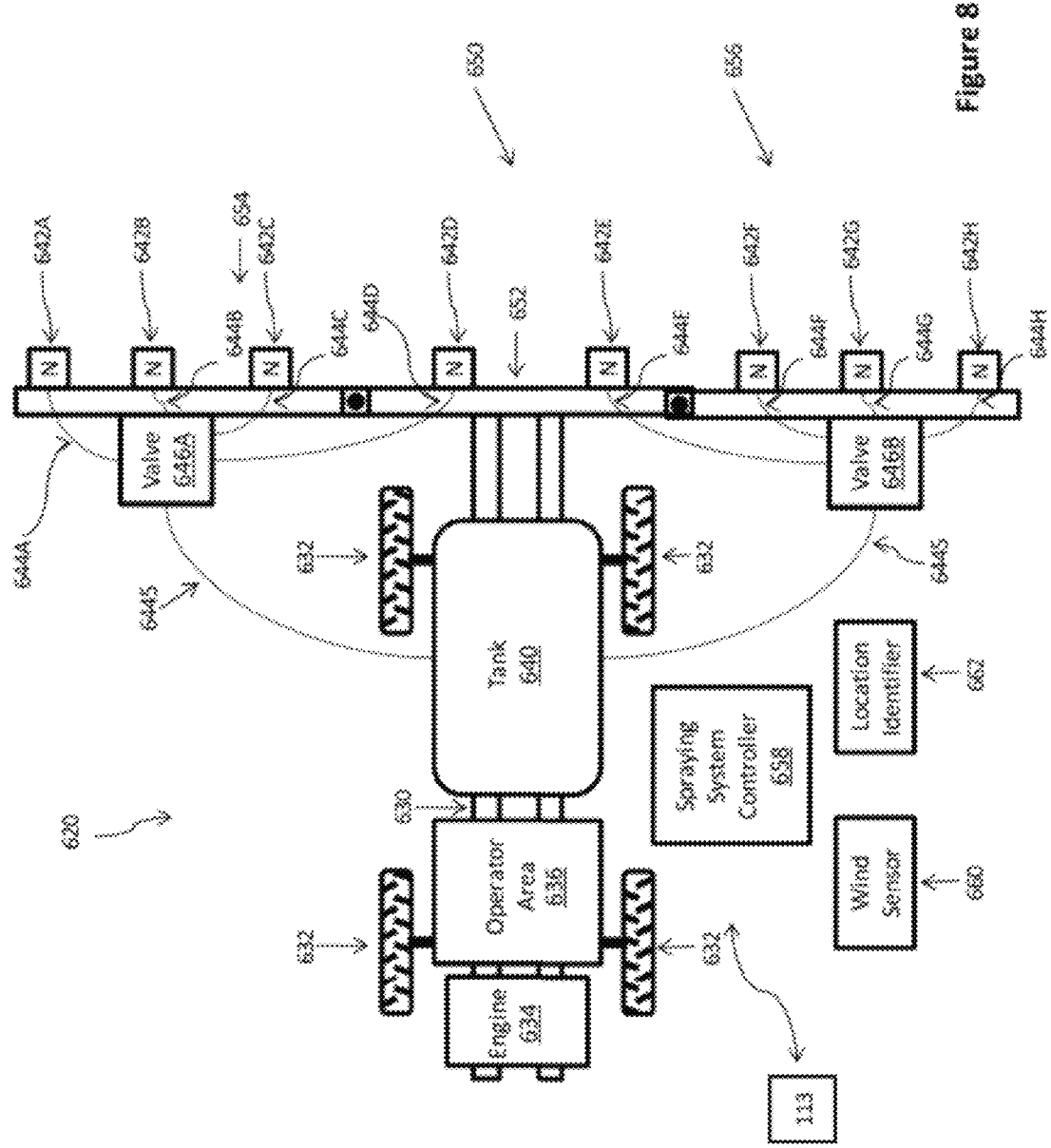
FIG. 8 is an exemplary spraying system according to an embodiment of the present disclosure.
Figure 9:
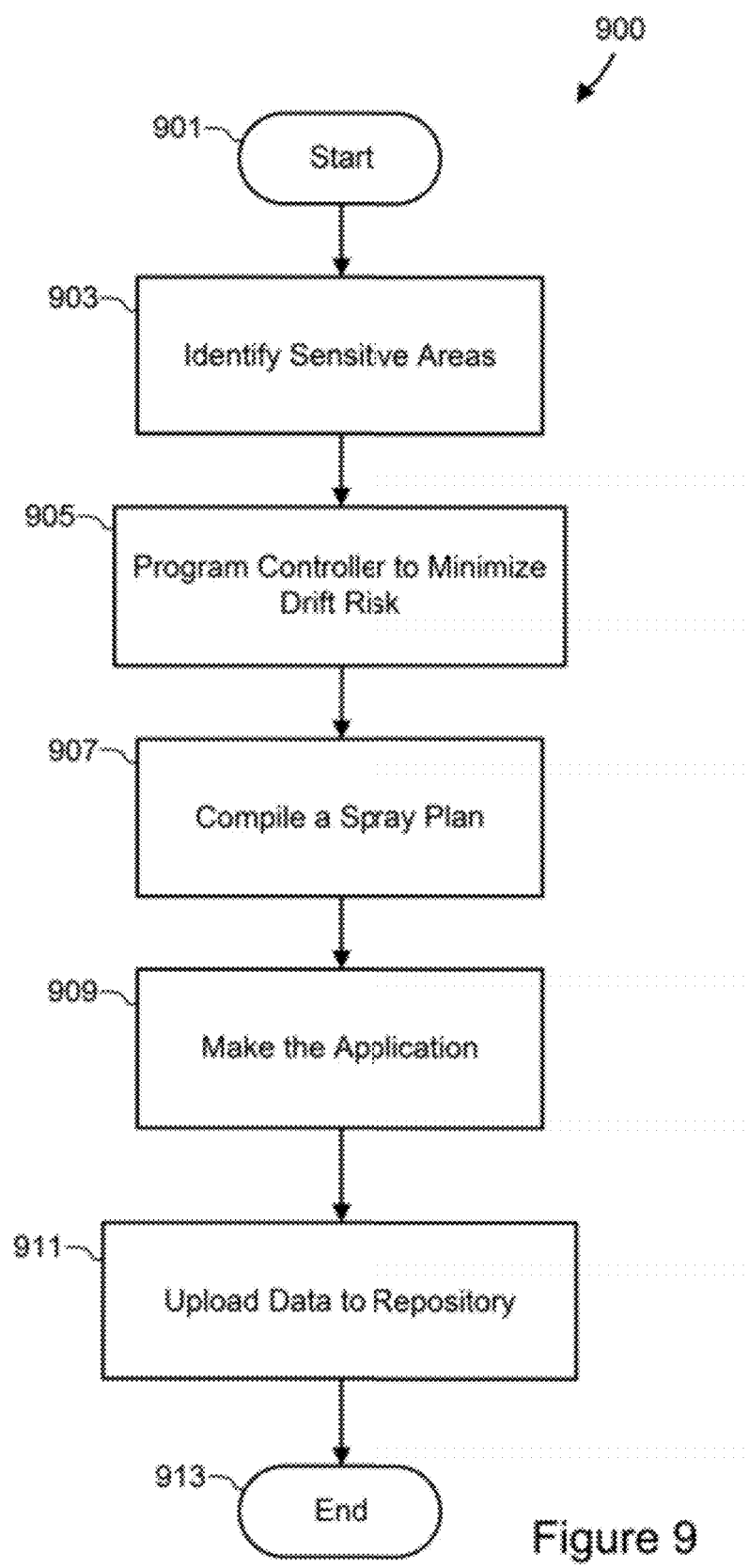
FIG. 9 is a flowchart showing a method of compiling a spray plan according to an embodiment of the present disclosure.

The distribution system 117, in an embodiment, is in communication with the sensitive area information receiving device 113, and receives sensitive area information from the sensitive area information receiving device 113. The distribution system 117 may apply substances, such as liquid chemicals, solid chemicals, and/or water, to a field or to portions of a field. In an embodiment, the distribution system 117 is moveable. In another embodiment, the distribution system 117 is fixed in the location of the field. In an embodiment, the distribution system 117 includes a sprayer or sprayers to apply liquids to a field. Shown with respect to FIG. 8, the sprayers may include one or more tanks to hold the liquid or liquids, a mixing device to mix liquids from different tanks together before application, and one or more valves to control the mixing of the liquids and/or the flow of liquids to applicators. The applicators may include one or more nozzles. In another embodiment, the distribution system 117 includes one or more spreading devices to spread solids to a field. The solids may include, but are not limited to, fertilizers, pesticides, fungicides, or nutrients. The spreading devices may include one or more holding areas to contain one or more solids, a mixing device to mix the solids before application to a field, and one or more outlets to mix the one or more solids and spread the solids onto the field. While a distribution system 117 may be a spraying system 620 with a plurality of ground engaging members 632 as shown in exemplary FIG. 8, other delivery devices may also be used. For example, and without limitation, the distribution system 117 may be associated with an aircraft, for example a crop dusting aircraft or a helicopter, or may be associated with a railroad, ballast sprayer, or boat.

The distribution system 117, in an embodiment, includes the ability to selectively spray, alter spray patterns or direction, alter pressure or spray distance, alter the relative size of the droplets of the spray, start and stop the spray, or change the direction or speed of the distribution system 117. If the distribution system 117 includes more than one sprayer, the distribution system 117 may include the ability to direct flow to one or more of the sprayers, or to alter the flow to one or more of the sprayers. In an embodiment, the distribution system 117 includes other instruments, such as wind sensors, temperature sensors, humidity sensors, pressure sensors, or other sensors, to monitor the local weather and/or field conditions. In an embodiment, the distribution system 117 also includes one or more sensors to indicate the position of the distribution system 117. In another embodiment, the sensors or instruments are associated with the sensitive area information receiving device 113.

In an embodiment, the distribution system 117 uses the sensitive area information, the location information provided by the location identifier 115 or sensitive area information receiving device 113, and/or one or more sensors to determine a spray pattern so that the spray from the distribution system 117 does not drift into locations of sensitive areas that have been identified as sensitive. The distribution system 117 may alter flow, position, droplet size, or may selectively reduce or eliminate flow to one or more sprayer to minimize or eliminate spray drift into locations of sensitive areas that have been identified as sensitive.

Returning to FIG. 2, a component view of the receiving system 101 of FIG. 1 according to an embodiment of the present disclosure is shown. The receiving system 101 in the illustrative embodiment includes an input module 203, a database module 205, and a sensitive area analysis module 207. In one embodiment, the receiving system 101 is a single system. In another embodiment, the receiving system 101 is two or more systems in communication with each other. In the illustrative embodiment, the receiving system 101 includes one or more input devices, one or more output devices, one or more processors, and memory 209 associated with the one or more processors. The memory 209 associated with the one or more processors may include, but is not limited to, memory associated with the execution of the modules, and memory associated with the storage of data. The receiving system 101 may also be associated with one or more networks 107, and may communicate with one or more additional systems via the one or more networks 107. The modules may be implemented in hardware or software, or a combination of hardware and software. The receiving system 101 may also include additional hardware and/or software to allow the receiving system 101 to access the input devices, the output devices, the processors, the memory, and the modules. In an embodiment, the modules, or a combination of the modules, are associated with a different processor and/or memory, for example on distinct systems, and the systems are located separately from one another. In another embodiment, the modules are be executed on the same system as one or more processes or services. The modules may be operable to communicate with one another and to share information. Although the modules are described as separate and distinct from one another, the functions of two or more modules may instead be executed in the same process, or in the same system.

The memory 209 includes computer readable media. Computer-readable media may be any available media that may be accessed by one or more processors of the receiving system 101 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by receiving system 101. The receiving system 101 may be a single system, or may be two or more systems in communication with each other. In one embodiment, the receiving system 101 includes one or more input devices, one or more output devices, one or more processors, and memory 209 associated with the one or more processors.

In the illustrative embodiment, the input module 203 receives data from one or more sensitive area identification devices 111 through the use of one or more networks 107. The input module 203 may also receive input over a network 107 from another system. For example, and without limitation, the input module 203 may receive one or more signals from third party systems 109 over one or more networks 107. In an embodiment, the input module 203 receives data from the network 107, and rearranges or reprocesses the data so that it may be transmitted to the sensitive area analysis module 207.

In the illustrative embodiment, the sensitive area analysis module 207 receives an input from the input module 203, and, in an embodiment, the sensitive area analysis module 207 reformats and/or analyzes the input and transmits the results to the database module 205. For example, the sensitive area analysis module 207 may receive an input in the form of one or more location identifiers 115 for a sensitive area location, and queries the sensitive area database 103 to determine if sensitive areas have been registered within one or more of the location identifiers 115. In another embodiment, the sensitive area analysis module 207 reformats the sensitive area identification information or sensitive area location information so that the information may be transmitted to the sensitive area database 103.

In the illustrative embodiment, the database module 205 receives an input, and transmits the input to the sensitive area database 103. In one embodiment, the database module 205 receives the input from the sensitive area analysis module 207 in the form of alphanumeric data, and transmits the data to the sensitive area database 103. The database module 205 and the sensitive area database 103 may be in communication with one another. For example, and without limitation, the database module 205 and the sensitive area database 103 may be in communication via a network 107, or may be in communication via a dedicated connection, such as a cable or radio link. In an embodiment, the database module 205 also reformats the data received from the sensitive area analysis module 207 into a format usable by the sensitive area database 103. For example, the database module 205 may create one or more files that may be read by the sensitive area database 103. In one embodiment, the database module 205 reformats the data into one or more electronic files that may be imported into a relational database, or into one or more strings of data that may be imported into a relational database.

Returning to FIG. 3 a component view of the sensitive area information transmitter 105 of FIG. 1 according to an embodiment of the present disclosure is shown. In an illustrative embodiment, the sensitive area information transmitter 105 includes a database module 303 and an input/output module 305. In an embodiment, the sensitive area information transmitter 105 is a single system. In another embodiment, the sensitive area information transmitter 105 is two or more systems in communication with each other. The sensitive area information transmitter 105 may include one or more input devices, one or more output devices, one or more processors, and memory associated with the one or more processors. The memory associated with the one or more processors may include, but is not limited to, memory associated with the execution of the modules, and memory associated with the storage of data. The sensitive area information transmitter 105 may also be associated with one or more networks 107, and may communicate with one or more additional systems via the one or more networks 107. The modules may be implemented in hardware or software, or a combination of hardware and software. In an embodiment, the sensitive area information transmitter 105 also includes additional hardware and/or software to allow the sensitive area information transmitter 105 to access the input devices, the output devices, the processors, the memory, and/or the modules. In an embodiment, the modules, or a combination of the modules, are associated with a different processor and/or memory, for example on distinct systems, and the systems are located separately from one another. In an embodiment, the modules are executed on the same system as one or more processes or services. The modules may be operable to communicate with one another and to share information. Although the modules are described as separate and distinct from one another, the functions of two or more modules may instead be executed in the same process, or in the same system.

The memory 307 includes computer readable media. Computer-readable media may be any available media that may be accessed by one or more processors of the sensitive area information transmitter 105 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by sensitive area information transmitter 105. The sensitive area information transmitter 105 may be a single system, or may be two or more systems in communication with each other. In one embodiment, the sensitive area information transmitter 105 includes one or more input devices, one or more output devices, one or more processors, and memory 307 associated with the one or more processors.

In the illustrative embodiment, the database module 303 receives an input, and transmits the input to the sensitive area database 103. In one embodiment, the database module 303 transmits a query to the sensitive area database 103 in the form of alphanumeric data, and receives information from the sensitive area database 103 in response to the transmitted query. The database module 303 and the sensitive area database 103 may be in communication with one another. For example, and without limitation, the database module 303 and the sensitive area database 103 may be in communication via a network 107, or may be in communication via a dedicated connection, such as a cable or radio link. In an embodiment, the database module 303 reformats the data received from the sensitive area database 103 into a format usable by the sensitive area information receiving device 113.

In the illustrative embodiment, the input/output module 305 receives data from one or more sensitive area information receiving devices 113 through the use of one or more networks 107. In an embodiment, the data is in the form of a location of the sensitive area information receiving device 113, and a request for sensitive area information surrounding the sensitive area information receiving device 113. In an embodiment, the input/output module 305 receives data from the network 107, and rearranges or reprocesses the data for transmission to the database module 303. In the illustrative embodiment, the database module 303 receives the data from the input/output module 305, and transmits to and receives information from the sensitive area database 103. In the embodiment, the database module 303 transmits the sensitive area database 103 information to the input/output module, and the input/output module transmits the sensitive area database 103 information to the sensitive area information receiving device 113.

Figure 4:
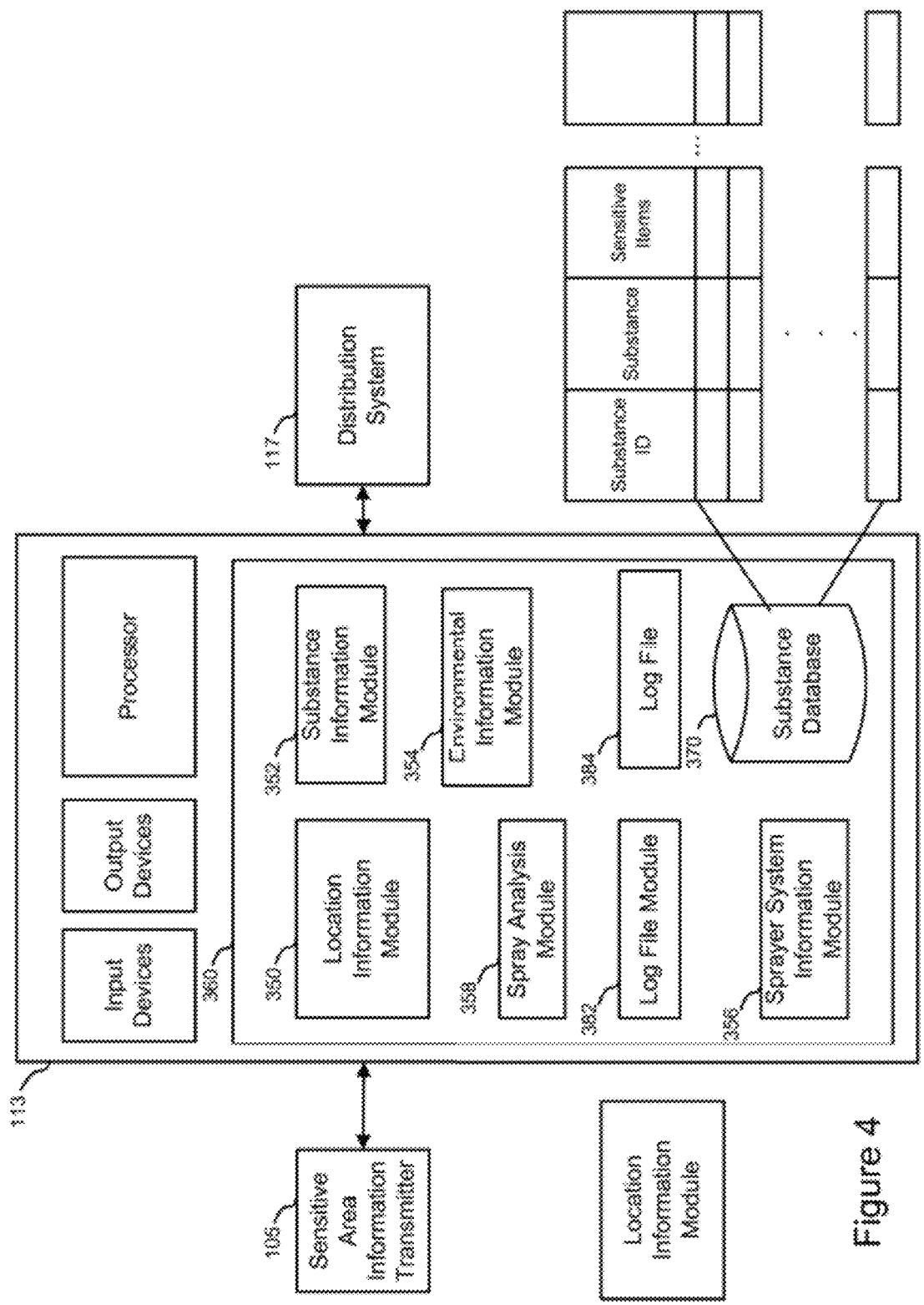
FIG. 4 is a component view of the sensitive area information receiving device of FIG. 1 according to an embodiment of the present disclosure.

Returning to FIG. 4, a component view of the sensitive area information receiving device 113 of FIG. 1 according to an embodiment of the present disclosure is shown. The sensitive area information receiving device 113 in the illustrative embodiment includes a location information module 350, a substance information module 352, an environmental information module 354, a sprayer system information module 356, a spray analysis module 358, and a log file module 382. In one embodiment, sensitive area information receiving device 113 is a handheld device. In one embodiment, sensitive area information receiving device 113 is a smartphone. In the illustrative embodiment, sensitive area information receiving device 113 includes one or more input devices, one or more output devices, one or more processors, and a memory 360 associated with the one or more processors. Exemplary output devices include audio output devices, visual output devices, and tactile output devices. An exemplary audio output device is a speaker. An exemplary visual output device is a display. An exemplary tactile output device is a vibration module. Exemplary input devices includes keys, roller balls, dials, switches, touch pads, touch screens, and other suitable input devices.

The memory 360 associated with the one or more processors may include, but is not limited to, memory associated with the execution of the modules, and memory associated with the storage of data. The sensitive area information receiving device 113 may also be associated with one or more networks 107, and may communicate with one or more additional systems via the one or more networks 107. The modules may be implemented in hardware or software, or a combination of hardware and software. The sensitive area information receiving device 113 may also include additional hardware and/or software to allow the sensitive area information receiving device 113 to access the input devices, the output devices, the processors, the memory, and the modules. In an embodiment, the modules, or a combination of the modules, are associated with a different processor and/or memory, for example on distinct systems, and the systems are located separately from one another. In another embodiment, the modules are be executed on the same system as one or more processes or services. The modules may be operable to communicate with one another and to share information. Although the modules are described as separate and distinct from one another, the functions of two or more modules may instead be executed in the same process, or in the same system.

The memory 360 includes computer readable media. Computer-readable media may be any available media that may be accessed by one or more processors of the receiving system 101 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by sensitive area information receiving device 113. The sensitive area information receiving device 113 may be a single system, or may be two or more systems in communication with each other.

In the illustrative embodiment, the location information module 350 determines a location of the sensitive area information receiving device 113 or provides an interface to receive a desired location through one of the input devices. The location may be a single location or may be an area. The substance information module provides an interface to receive a desired substance to be applied at the specified location. The environmental information module 354 determines the environmental characteristics for the specified location or provides an interface to receive default anticipated environmental characteristics. Exemplary environmental characteristics include wind speed and direction. In one embodiment, environmental information module 354 queries at least one third party system 109 for the environmental characteristics. The sprayer system information module 356 provides an interface to receive characteristics of a spraying system to be used or communicates with distribution system 117 to determine the characteristics of the spraying system.

The spray analysis module 358 based on the specified location determines sensitive areas within the region of the specified location. Based on the sprayer system characteristics and the environmental characteristics, the spray analysis module 358 determines the likelihood of spray drift impinging upon any sensitive areas in the region of the specified location.

In one embodiment, sensitive area information receiving device 113 also includes a substance database 370. Substance database 370 includes a listing of a plurality of substances and identifies types of plants or animals that are sensitive to each substance. In one embodiment, the listing of substances is presented in the interface of substance information module 352 so that a user of sensitive area information receiving device 113 may select one of the listed substances. In one embodiment, the substance database 370 is updated by contacting one or more third party system 109. In one example, a manufacturer of substances may provide a substance database for downloading from server. In this example, sensitive area information receiving device 113 would download a copy or an update to an existing copy for storage in memory 360. Sensitive area information receiving device 113 may receive information on substances from, for example and without limitation, product manufacturers, one or more crop data management systems ("CDMS"), or databases supplied or maintained by regulatory agencies, for example the Environmental Protection Agency or other state or federal agencies. The information may include, but is not limited to, applicable best management practices or label requirements of substances, such as buffer zone requirements or suggestions. Information may also include labels for substances, or data tables regarding substances.

In one embodiment, spray analysis module 358 provides an indication of all sensitive areas within the region of the specified location. In one embodiment, spray analysis module 358 provides an indication of only sensitive areas within the region of the specified location that are sensitive to proposed substance to be sprayed. In one embodiment, spray analysis module 358 provides a first indication of all sensitive areas within the region of the specified location and a second indication only sensitive areas within the region of the specified location that are sensitive to proposed substance to be sprayed. Certain types of sensitive areas may be sensitive to generally all substances, such as sensitive areas with plants or animals being marketed as organically grown or raised. Other types of sensitive areas may be sensitive to a first substance, but not a second substance. In one embodiment, spray analysis module 358 attempts to determine alternative substances to be sprayed that the identified sensitive areas may not be sensitive to as an alternative to the selected substance.

The log file module 382 captures information related to the application of a substance to an area. In one embodiment, the log file module 382 captures information when the sensitive area information receiving device 113 is activated. In another embodiment, the log file module 382 may be started or stopped, so that the log file module 382 captures or does not capture information. In one embodiment, the log file module 382 may be started or stopped by the user. In another embodiment, the log file module 382 may be started or stopped remotely, by a third party. The log file module 382 captures, for example and without limitation, the type of substance being applied, the date, the current time, the location of one or more of the sprayers, the location of the projected route, the amount of deviation from the actual to the projected routes, the actions of the user, information regarding the current weather, the location of one or more sensitive areas, the proximity of the sprayers to the sensitive areas, or the warnings generated by the sensitive area information receiving device 113.

The log file module 382 may write to a log file 384. In one embodiment, the log file 384 is stored as one or more files in the memory of the sensitive area information receiving device 113. At periodic intervals, the information stored in the one or more files may be transmitted to one or more additional systems, for example the sensitive area information transmitter 105 or the sensitive area database 103. When the information stored in the one or more files is transmitted, the information or the log files 384 may be deleted from the sensitive area information receiving device 113, or may be archived with the sensitive area information receiving device 113. In another embodiment, the information from the log file module 382 is transmitted to the sensitive area information transmitter 105 without being stored with the sensitive area information receiving device 113, or the information from the log file module 382 is buffered in memory associated with the sensitive area information receiving device 113 before being transmitted. In one embodiment, the one or more log files 384 are stored in a relational database. In another embodiment, the one or more log files 384 are stored in a text file, or an encrypted file.

Figure 5:
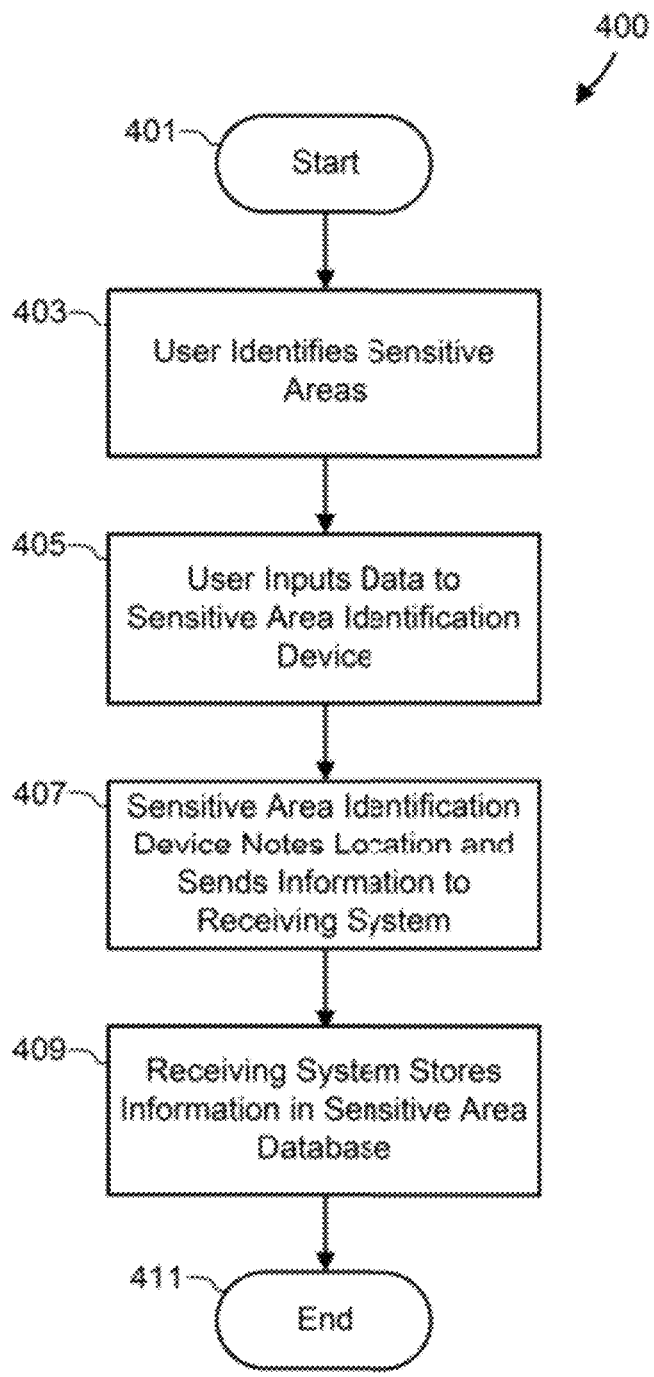
FIG. 5 is a flowchart showing a method of identifying sensitive areas according to an embodiment of the present disclosure.

FIG. 5 shows a flowchart showing a method 400 of identifying sensitive areas according to an embodiment of the present disclosure. The method may begin as illustrated in box 401. The user may identify one or more sensitive areas, as illustrated in box 403. In an embodiment, the user marks the sensitive areas by using a sensitive area identification device 111 to note the location of a field containing sensitive areas. In another embodiment, the user marks the position of one or more sensitive areas on an electronic map, or marks the location of one or more sensitive areas on a paper map, and then scans or faxes the paper map to an operator, who inputs the location information from the paper map into the sensitive area database 103. In another embodiment, the user may communicate with an operator via, for example and without limitation, a telephone, a paging device, or other communication over a network 107 to note the location and type of one or more sensitive areas.

The user may use the sensitive area identification device 111 to note the type and location of the sensitive areas, as illustrated in box 405. The user may use the sensitive area identification device 111 to note the type of sensitive areas by using, for example and without limitation, a drop-down list of sensitive items including one or more crops, animals, sensitive locations, or other sensitive or endangered items; one or more codes to indicate specific types of crops, animals, sensitive locations, or other sensitive or endangered items; or other method of selecting information. In one embodiment, the user uses a camera or camera-enabled device, to take a picture of the crops or seeds planted, and the crop identification device 111 and/or the receiving system 101 use image recognition to determine the type of seed and thus the type of crops. In another embodiment, the user speaks or gestures the name of the crops, and the crop identification device 111 uses voice or pattern recognition to determine the specific type of crop.

The sensitive area identification device 111 may note the type of crop, and may note the location of the crop as well, as illustrated in box 407. In an embodiment, the sensitive area identification device 111 uses a global positioning system or other global positioning satellite system or other location identifier 115. The sensitive area identification device 111 transmits the sensitive area identification and the location information to the receiving system 101. The receiving system 101 may transmit an acknowledgement to indicate that the sensitive area identification information has been successfully transmitted to the receiving system 101.

The receiving system 101 may receive the sensitive area information, including the type and location information, and may transmit the sensitive area information to the sensitive area database 103, as illustrated in box 409. In an embodiment, the receiving system 101 adds information, deletes information, or alters information from the information received from the sensitive area identification device 111 before the information is transmitted and recorded in the sensitive area database 103. The method 400 may end as illustrated in box 411.

Figure 6:
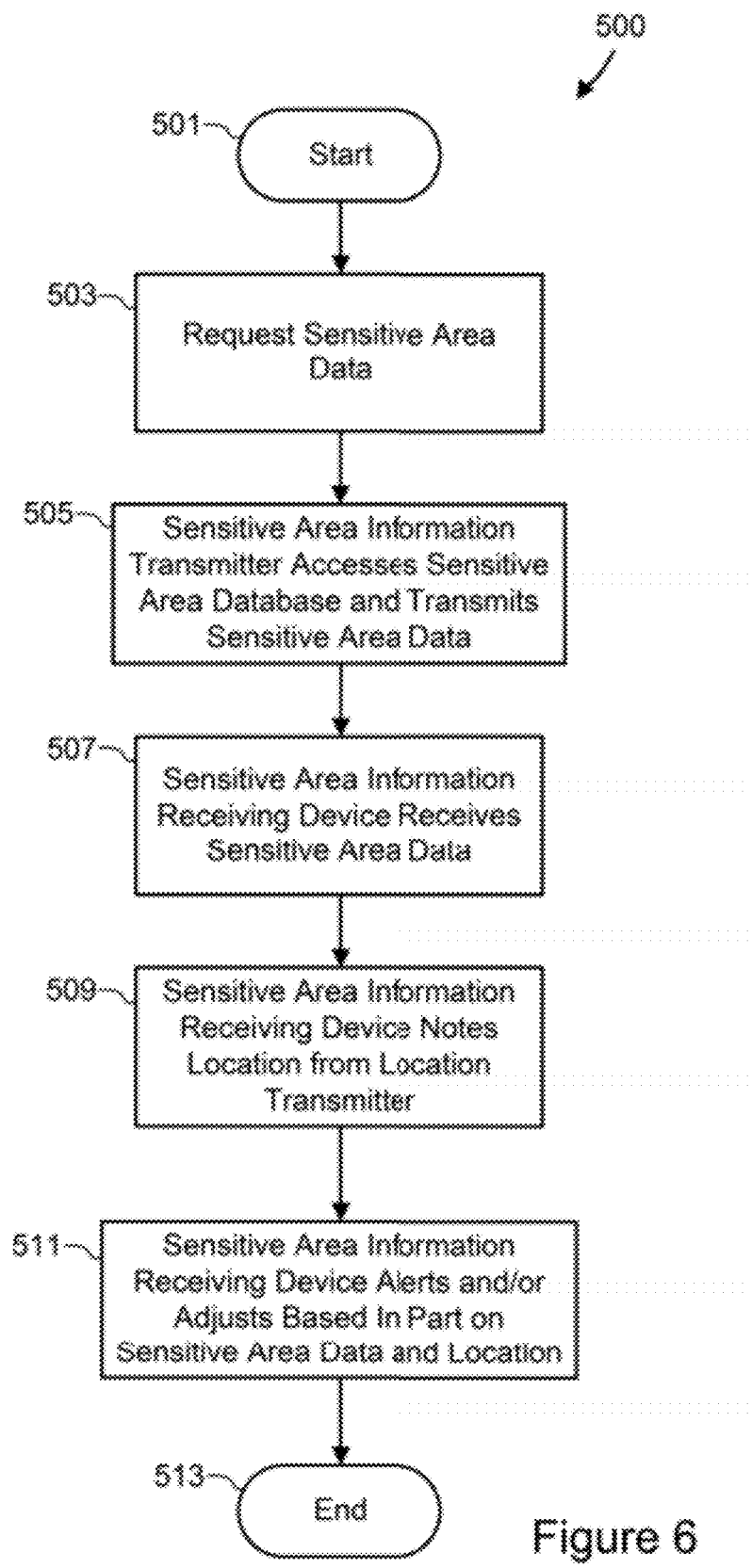
FIG. 6 is a flowchart showing a method of locating sensitive areas according to an embodiment of the present disclosure.

FIG. 6 shows a flowchart showing a method 500 of locating crops according to an embodiment of the present disclosure.

The method may begin as illustrated in box 501. In an embodiment, the sensitive area information receiving device 113 requests sensitive area information from the sensitive area information transmitter 105 as illustrated in box 503. The sensitive area information receiving device 113 transmits the request to the sensitive area information transmitter 105 through, for example, a network 107. The sensitive area information receiving device 113 may use a location identifier 115 to determine the location of the sensitive area information receiving device 113, or the location of the sensitive area information receiving device 113 may be determined another way. For example, and without limitation, the user may input the location of the sensitive area information receiving device 113, or may provide other information to the sensitive area information transmitter 105 to allow the sensitive area information transmitter 105 to approximately or precisely locate the sensitive area information receiving device 113. In another embodiment, the sensitive area information receiving device 113 does not transmit location information to the sensitive area information transmitter 105, but the sensitive area information transmitter 105 sends all or part of the sensitive area information located in the sensitive area database 103 to the sensitive area information receiving device 113. In an embodiment, the sensitive area information receiving device 113 also requests sensitive area information for a predetermined or user defined area around the sensitive area information receiving devices' 113 current location, or other location. For example, and without limitation, the sensitive area information receiving device 113 may request sensitive area information for a three mile radius from the sensitive area information receiving devices' 113 current location. The sensitive area information receiving device 113 may also request sensitive area information based on other identifiers. For example, the sensitive area information receiving device 113 may request sensitive area information for one or more specific types of crops, including buffer zone information, or one or more types of crops that have an adverse interaction with a specific chemical, or request sensitive area information for crops within a zip code, city, county, state, or other geographical boundary identifier.

In an embodiment, the sensitive area information transmitter 105 receives the location data from the sensitive area information receiving device 113, accesses the sensitive area database 103, and requests sensitive area information from the sensitive area database 103 based at least in part on the location information received from the sensitive area information receiving device 113, as illustrated in box 505. The sensitive area information transmitter 105 may, for example and without limitation, request sensitive area information for a preset or user defined radius from the current location transmitted by the sensitive area information receiving device 113. The sensitive area information transmitter 105 may also request sensitive area information from the sensitive area database 103 according to the request transmitted from the sensitive area information receiving device 113. The sensitive area database 103 accesses the sensitive area information, and transmits the requested sensitive area information, if any is available, to the sensitive area information transmitter 105 via one or more networks 107. The sensitive area information transmitter 105 receives the sensitive area information, and, in an embodiment, performs one or more transformations on the sensitive area data, to present it to the sensitive area information receiving device 113. For example, and without limitation, the sensitive area information transmitter 105 may overlay the sensitive area information onto a map, and transmit the map and the sensitive area information to the sensitive area information receiving device 113. In another embodiment, the sensitive area information transmitter 105 adds or deletes information from the sensitive area information before transmitting it to the sensitive area information receiving device 113. For example, and without limitation, the sensitive area information transmitter 105 may remove sensitive area information for crops that are outside of the requested range of crops, or may remove sensitive area information that is outside of a radius or other geographical boundary transmitted by the sensitive area information receiving device 113. The sensitive area information transmitter 105 transmits the sensitive area information to the sensitive area information receiving device 113 via the network 107. In an embodiment, the sensitive area information transmitter 105 does not modify the sensitive area information transmitted from the sensitive area database 103, transmitting the unmodified sensitive area information received from the sensitive area database 103 to the sensitive area information receiving device 113.

The sensitive area information receiving device 113 receives sensitive area information from the sensitive area information transmitter 105, as illustrated in box 507. The sensitive area information receiving device 113 may receive the sensitive area information from a network 107, or through other communication methods. For example, and without limitation, the sensitive area information receiving device 113 may receive the sensitive area information from a cellular data network 107, or other type of wireless network 107.

In an embodiment, the sensitive area information receiving device 113 may interact with the location transmitter to receive information related to the location of the sensitive area information receiving device 113, as illustrated in box 509. In one embodiment, the sensitive area information receiving device 113 receives GPS signals from a GPS system, and uses the one or more GPS signals to calculate its position. In another embodiment, the sensitive area information receiving device 113 uses one or more signals from cellular networks 107 and/or cellular network 107 stations to triangulate or otherwise calculate its location. In another embodiment, the sensitive area information receiving device 113 uses one or more internal devices to calculate its location. For example, the sensitive area information receiving device 113 may contain a compass or an inertial guidance system, or may include a device or sensor to measure linear distance, or may include one or more accelerometers and/or gyroscopes. The sensitive area information receiving device 113 may determine its location using one or more location sensors, and may determine the location of one or more crops based at least in part on the sensitive area information transmitted from the sensitive area information transmitter 105.

In an embodiment, the sensitive area information receiving device 113 sends one or more alerts and/or makes one or more adjustments to one or more distribution systems 117 based on the location of the sprayers, the location of crops or areas containing animals that may be harmed by the substance or substances that the distribution system 117 is delivering, and other information, such as weather conditions, that may be received by other sensors or instruments and transmitted to the sensitive area information receiving device 113 and/or the distribution system 117, as illustrated in box 511. The sensitive area information receiving device 113 may, for example and without limitation, provide a visual, auditory, or tactile alert to the user. The distribution system 117 may also include, for example, and without limitation, the ability to selectively spray, alter spray patterns or direction, alter pressure or spray distance, or alter the relative size of the droplets of the spray. If the distribution system 117 includes more than one sprayer, the distribution system 117 may include the ability to direct flow to one or more of the sprayers, or to alter the flow to one or more of the sprayers. The method may end, as illustrated in box 513.

While the sensitive area information receiving device 113 is depicted in some embodiments as being portable, where a user inputs variables in real time during or before an application, in other embodiments, the sensitive area information receiving device 113 may be a desktop computer, a laptop computer, a notepad computer, or other type of computer, and the user may interact with the computer and prepare a plan before applying substances to a field. In FIG. 9, a flowchart showing a method 900 of compiling a spray plan according to an embodiment of the present disclosure is shown. The method begins at box 901. In box 903, the user interacts with the sensitive area information receiving device 113 to identify sensitive areas around the field or fields to which the user intends to apply chemicals. The user may input this information to the sensitive area information receiving device 113 by typing one or more locations into the sensitive area information receiving device 113, or by highlighting one or more areas on a map. The sensitive area information receiving device 113 communicates the information to the sensitive area information transmitter 105, which communicates the information to the sensitive area database 103. The sensitive area database 103 uses the information and transmits the location of sensitive areas to the sensitive area information transmitter 105, which then transmits the information to the sensitive area information receiving device 113. The sensitive area information receiving device 113 uses the information from the sensitive area database 103, and may also use additional information, such as weather or information from the third party systems 109, to create one or more plans, shown in box 907.

The plans include information for avoiding the sensitive areas, and may include, but are not limited to, information regarding times and dates of application, applicator speed, amounts or flow rates of the substances, or other information to minimize the risk of substances entering the sensitive areas. The sensitive area information receiving device 113 may present the plans in the form of a paper printout, or may transmit the plans electronically to another device. For example, the sensitive area information receiving device 113 may transmit the plans to a portable computer. The portable computer may interface with the distribution system 117, or the portable computer may provide alerts or other signals to the user. In one embodiment, the sensitive area information receiving device 113 transmits the plans to a computer or other device located in or on the distribution system 117.

In an alternate embodiment, the sensitive area information receiving device 113 may be used to perform predictive modeling of one or more future substance applications or other potential environmental impact models. The user may input variables into the sensitive area information receiving device 113 including, but not limited to, the area of proposed application, the type or amount of substance, application directions related to the type or amount of substance, the time of the future application, intended distribution system 117 parameters, the rate of release of the substance, the method used to release the substance, or other variables. In the embodiment, the sensitive area information receiving device 113 receives the variables, and retrieves the data from the sensitive area database 103 and/or one or more of the third party systems 109, and generates a prediction based on the information received from the user and from the sensitive area database 103 and/or one or more of the third party systems 109. The third party systems 109 may provide data related to past, current, or future environmental conditions such as weather or placement of sensitive areas, data regarding geologies of the site of proposed application or other areas, data regarding the topologies of the site of proposed application or other areas, or other data regarding the site of proposed application or other areas. Other data that may be considered include the release rate of the proposed application, environmental impact analyses for the substance or substances to be applied, or spray drift modeling data from a sprayer or distribution system.

In one embodiment, the prediction is an indicator to make the application based on the input variables, or an indicator to not make the application based on the input variables. In this embodiment, the user may change one or more of the input variables and re-execute to receive a different indication based on the updated input variables. In another embodiment, the prediction includes a time and/or date to make the application, based at least in part on the input variables and the data retrieved from the one or more third party systems 109. The time and/or date may be a time or date of an ideal time to make the application within a range of dates specified by the user, or may be an ideal time within a predetermined range of dates.

In one example of predictive modeling, the sensitive area information receiving device 113 may receive input from the user regarding the type and amount of substance to be applied to a specific field at a specific date. The sensitive area information receiving device 113 may, for example, query a third party system 109 to retrieve water table information or watershed information, and may recommend not spraying the substance at the particular time, as the information received from the third party system 109 may indicate, for example, that the water table may be too high to spray the substance. The sensitive area information receiving device 113 may recommend the application occur on another day, or that the distribution system 117 parameters be altered to achieve a more desirable outcome.

In another example of predictive modeling, the sensitive area information receiving device 113 may receive input from the user regarding the type and amount of substance to be applied to a specific field at a specific date. The sensitive area information receiving device 113 may, for example, query a third party system 109 to retrieve weather or other meteorological data, and may recommend spraying or not spraying the substance at the particular time. For example, the third party system 109 may indicate that rain or high winds are predicted during one or more times, and the rain may remove the applied substance too quickly, or more quickly than is recommended in the application instructions. In another example, the third party system 109 may indicate that high winds are predicted during one or more times, which may create drift concerns, or may reduce the effectiveness of the applied substance. The sensitive area information receiving device 113 may recommend the application occur on another day, or that the distribution system 117 parameters be altered to achieve a more desirable outcome.

In box 909, the user takes the printouts or the portable computer with the plans to the distribution system 117, and makes the application onto the field. If conditions change after the user has created the plans, in one embodiment, the sensitive area information receiving device 113 transmits updated information to the portable computer, or may attempt to transmit the updates to the user via other methods. For example, and without limitation, the sensitive area information receiving device 113 may transmit a text message, or an e-mail message, or other form of electronic communication, to the user to inform of updated plans. During the application, the user or other system may note any deviations from the plan, and may log the deviations in one or more data files, or log files. The log files may indicate the time and date of any deviations, and may also include information related to the deviation. For example, the location, the substance applied, the amount of deviation from the plan, and/or the user's actions may be recorded, or the user may record the information.

In box 911, the data from the application may be uploaded to a repository to track and maintain compliance information. The repository may be the sensitive area information transmitter 105, or may be another system to store and access the compliance information. The user may upload the log files, or the user may input information into an interface regarding deviations from the plan. The method 900 may end at box 913.

FIG. 7 is an exemplary field showing crops and an exemplary spraying system 620 according to an embodiment of the present disclosure. While a spraying system 620 is used in the example, other substance distribution systems may also be used. For example, and without limitation, an airplane, a helicopter, a boat, a railroad, or a ballast sprayer may be used. A first field 601 and a second field 603 are adjacent to one another. The second field 603 includes a bed of sensitive crops 611 and two beds of insensitive crops 609.

The sensitive crops 611, in the exemplary embodiment, are sensitive to the substance or substance that the spraying system 620 in the first field 601 is planning on delivering. The insensitive crops 609, in the exemplary embodiment, are not sensitive to the substance or substance that the distribution system 117 in the first field 601 is planning on delivering. The sensitive crops 611 and the insensitive crops 609 are marked using one or more crop identification devices 111, which may note the location and the content of the beds. In another embodiment, only the sensitive crops 611 are identified and noted with the crop identification device 111.

Spraying system 620 is to follow a path 622 through field 601 while spraying the crops in field 601. Exemplary north is denoted in element 613. During spraying, the wind is blowing in a north-eastern direction 624 increasing the drift of a sprayed substance in direction 624.

Referring to FIG. 8, an exemplary embodiment of spraying system 620 is shown. Spraying system 620 is an example of a mobile spraying system. Other exemplary spraying systems may be fixed systems having moveable arms supporting spray nozzles, such as irrigation style systems.

Spraying system 620 includes a frame 630 supported by a plurality of ground engaging members 632. Ground engaging members 632 are rotatable relative to the frame 630. At least one of the ground engaging members 632 is operatively coupled to an engine 634 of spraying system 620 to provide power to propel spraying system 620 relative to the ground. Spraying system 620 further includes an operator area 636 having a plurality of controls whereby an operator is able to navigate spraying system 620, such as along path 622.

Spraying system 620 further includes a tank 640 containing the substance to be sprayed by spraying system 620. The interior of tank 640 is in fluid communication with a plurality of spray nozzles 642A-H through a plurality of fluid conduits 644A-J and a plurality of valves 646A-B. In one embodiment, a pump is provided to pump the fluid from tank 640 to the valves 646A-B under pressure. In the illustrated embodiment, spray solution is feed from tank 640 to valve 644A through fluid conduit 6441. Valve 644A, in turn, feeds the spray solution to the respective spray nozzles 642A-D through respective fluid conduits 644A-D. In one embodiment, valve 644A communicates a constant pressure of the spray fluid to every one of the spray nozzles 642A-D. In one embodiment, valve 644A is a manifold and provides individual control relative to each of spray nozzles 642A-D such that the pressure of spray fluid communicated to each spray nozzle is independently controllable. In the illustrated embodiment, spray solution is feed from tank 640 to valve 644B through fluid conduit 644J. Valve 644B, in turn, feeds the spray solution to the respective spray nozzles 642E-H through respective fluid conduits 644E-H. In one embodiment, valve 644B communicates a constant pressure of the spray fluid to every one of the spray nozzles 642E-H. In one embodiment, valve 644B is a manifold and provides individual control relative to each of spray nozzles 642E-H such that the pressure of spray fluid communicated to each spray nozzle is independently controllable. In one embodiment, spray nozzles 642A-H are controllable to alter an amount of spray fluid exiting the respective nozzle. In this example, valves 644A-B are not needed.

Each of spray nozzles 642A-H are supported on a spray frame 650. Nozzles 642D-E are supported on a center spray frame member 652 supported by frame 630 of spraying system 620. Nozzles 642A-C are supported on a first boom arm 654 rotatably coupled to center spray frame member 652. Nozzles 642F-H are supported on a second boom arm 656 rotatably coupled to center spray frame member 652.

Spraying system 620 also includes a spraying system controller 658 which controls the communication of spraying fluid from tank 640 to spray nozzles 642. In one embodiment, spraying system controller is supported by frame 630. In one embodiment, spraying system controller 658 receives input from an environmental sensor 660, such as a wind sensor, to determine the environmental conditions surrounding spraying system 620. In one embodiment, spraying system controller 658 receives input from a location identifier unit 662, such as a GPS device, to determine a current location of spraying system 620. In one embodiment, one or both of environmental sensor 660 and location identifier unit 662 are monitored by sensitive area information receiving devices 113 which in turn reports to spraying system controller 658. In one embodiment, one or both of environmental sensor 660 and location identifier unit 662 are supported by frame 630.

Further, spraying system controller 658 is in communication with sensitive area information receiving devices 113 to determine the relationship of spraying system 620 relative to sensitive crops within the vicinity of spraying system 620 and to adjust one or more spraying characteristics of spraying system 620 accordingly. In one embodiment, the determination of spray characteristic adjustment is made by sensitive area information receiving devices 113. In one embodiment, the determination of spray characteristic adjustment is made by spraying system controller 658. In one embodiment, sensitive area information receiving devices 113 is integrated into spraying system controller 658.

Figure 7:
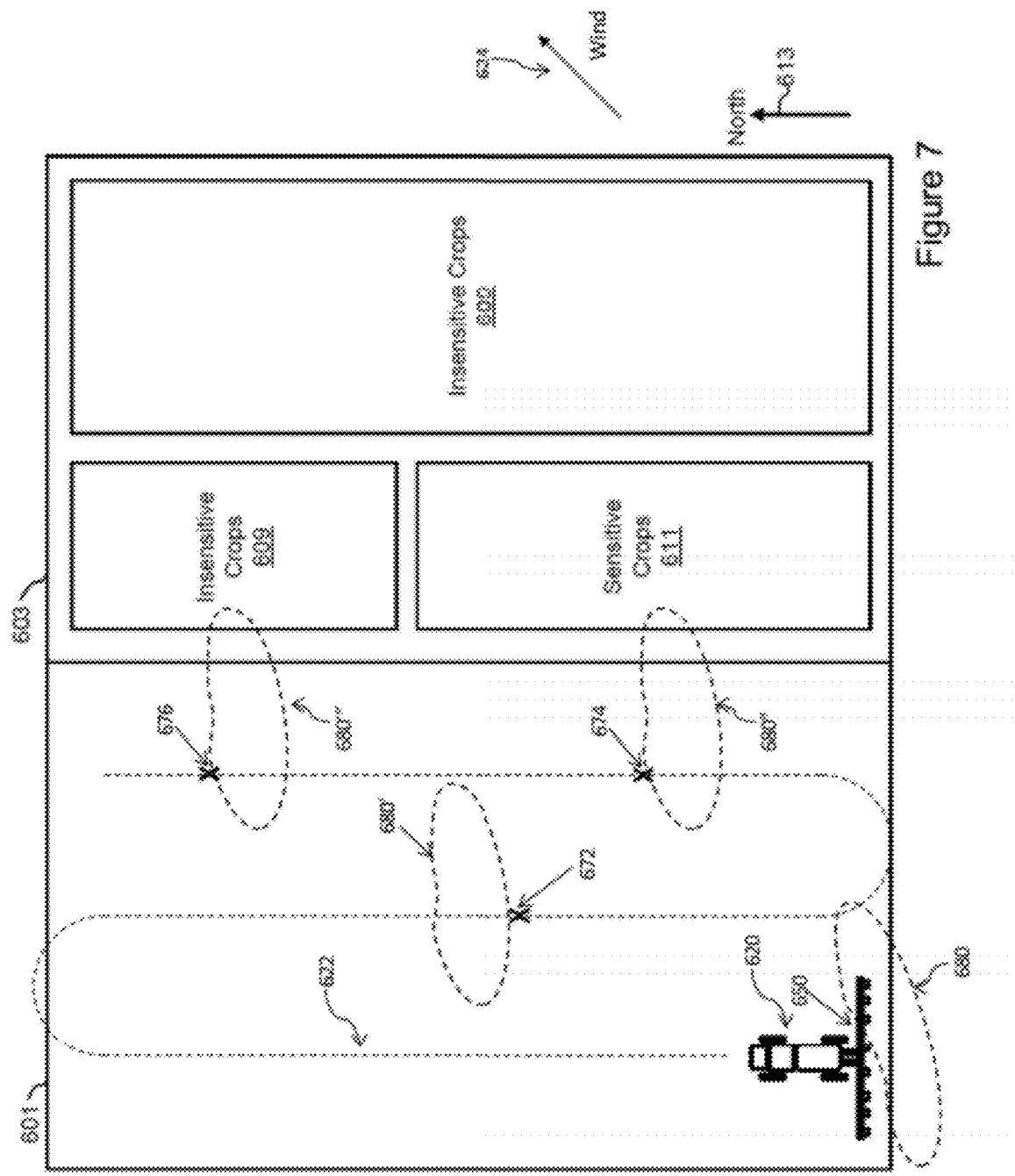
FIG. 7 is an exemplary field showing sensitive areas according to an embodiment of the present disclosure.

As an example, when spraying system 620 is at the location shown in FIG. 7, based on the information derived from sensitive area database 103, environmental sensor 660, and location identifier unit 662, one of sensitive area information receiving devices 113 and spraying system controller 658 determines that a spray region 680 of spraying system 620 is not overlapping sensitive crops 611 or any other sensitive area. Therefore, spraying system 620 may operate normally. Spray region 680 is a representation of the anticipated area in which spray may fall to ground. As shown in FIG. 7, spray region 680 is elongated to the east of spraying system 620 and forward of spray frame 650 of spraying system 620 on the eastern side. This shape of spray region 680 is due to the direction and speed of the wind.

Of course as spraying system 620 moves through first field 601 and as the speed and direction of the wind change the shape and area of spray region 680 changes. For example, when spraying system 620 is positioned at location 672 in first field 601, the spray region may have the shape of region 680'. This spray region 680' also does not overlap any known sensitive areas so spraying system 620 may operate normally. When spraying system 620 is positioned at location 674 in first field 601, the spray region may have the shape of region 680". This anticipated spray region 680" does overlap sensitive crops 611 so spraying system 620 may not operate normally without risking damage to sensitive crops 611. As such, one of sensitive area information receiving devices 113 and spraying system controller 658 causes an alteration of the operation of spraying system 620 to reduce the area or shape of spray region 680" to prevent overlap with sensitive crops 611. In one embodiment, an indicator is provided to an operator of spraying system 620 of the risk of overlap and the operator alters the operation of spraying system 620 based thereon. Exemplary indicators include audio indicators, visual indicators, tactile indicators, or combinations thereof.

In one embodiment, the indicator provides multiple levels of indication to an operator. In one embodiment, visual indicator, such as one or more lights or a visual icon on a display, provides multiple visual indications based on a distance to a sensitive area. For example, for a given distance, a green indicator is provided if the given distance is within a first safe range from a sensitive area, a yellow indicator is provided if the given distance is within a second caution range from a sensitive area, and a red indicator is provided if the given distance is within a third range from a sensitive area. The distances that correspond to the boundaries for each range may be user specified valves or preprogrammed values. In one embodiment, the distances are adjusted based on environmental conditions, such as wind. In one embodiment, the given distance is an anticipated boundary of the spray region 680.

In one embodiment, one of sensitive area information receiving devices 113 and spraying system controller 658 automatically alters the operation of spraying system 620 to prevent overlap. In one example, the operation of one or more of valves 644 and nozzles 642 is altered to change the spray pattern. In the case of location 674, nozzles 642A and 642B may be effectively turned off to shorten the extent of spray region 680" towards the east. As spraying system 620 progresses along path 622 the operation of spraying system 620 may return to normal, such as in location 676 whereat region 680'" (for normal operation) does not overlap any sensitive area.

In one embodiment, the sensitive area information receiving device 113 (or spraying system controller 658) notes the location of spraying system 620 in the first field 601. The sensitive area information receiving device 113 requests crop information for crops located around spraying system 620. The crop information, in the exemplary embodiment, are stored in the sensitive information database 103, and are transmitted from the sensitive information database 103 to the sensitive area information transmitter 105, and then from the sensitive area information transmitter 105 to the sensitive area information receiving device 113 using a network 107. The sensitive area information receiving device 113 identifies the location of the insensitive crops 609 and the sensitive crops 611, or only the sensitive crops 611. Sensors in spraying system 620 and/or the sensitive area information receiving device 113 indicate that the wind is blowing from the west to the east at a high rate of speed. Sensitive area information receiving devices 113 identifies that spraying system 620, if allowed to spray normally, may create droplets that may drift into the sensitive crops 611. The sensitive area information receiving devices 113 alters the spray pattern of spraying system 620 by, for example, limiting the flow to the spray nozzles 642 or changing the droplet size so that the droplets are unlikely to drift into the sensitive crops 611. The size may be adjusted based on the pulse width of the sprayer and with variable orifice nozzles. In one embodiment, auto steer technology may be used to divert the sprayer of the spraying system. As the wind speed or wind direction changes or the location of spraying system 620 changes, sensitive area information receiving devices 113 changes flow, droplet size, and/or other spray characteristics so that droplets are unlikely to drift into the sensitive crops 611.

While this disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains.

We claim:

1. A method of adjusting a spraying system, comprising:
   electronically determining a current location of the spraying system on a field, the spraying system configured to spray a first substance;
   electronically determining a separation between one or more sensitive areas located in or adjacent the field and the current location of the spraying system on the field, the one or more sensitive areas being determined based on a type of the first substance in relation to a known adversity of at least one of a plant, an animal, a fungus and a bacterium to the first substance; and
   adjusting an output of the spraying system in response to a first one of the one or more sensitive areas being within a first distance from the current location.

2. The method of claim 1, wherein the current location may be determined by Global Positioning System (GPS).

3. The method of claim 1, wherein adjusting the spraying system may include one or more of changing a speed of the spraying system, changing a direction of the spraying system, altering a droplet size of the spraying system, or changing a boom height of the spraying system.

4. The method of claim 1, wherein the spraying system includes a log file to capture information related to the spraying system, wherein the log file captures one or more of the first substance being applied, a date, a current time, the current location of the spraying system, a location of a projected route, an amount of deviation from an actual route to the projected route, actions of a user, information regarding current weather, a location of the one or more sensitive areas, a proximity of the spraying system to the one or more sensitive areas, and a warning.

5. The method of claim 1, wherein the spraying system interfaces with a database to determine information related to the one or more sensitive areas.

6. The method of claim 5, wherein the database is a substance database, the substance database includes a listing of a plurality of substances and associated sensitive items.

7. The method of claim 6, further comprising a step of selecting through an interface one of the plurality of substances.

8. The method of claim 1, wherein the spraying system interfaces with a third party system to determine additional environmental factors related to the one or more sensitive areas.

9. The method of claim 1, further comprising: providing an indication when the first one of the one or more sensitive areas is within the first distance from the current location, the indication being one of a visual indication, an audio indication, and a tactile indication.

10. The method of claim 1, further comprising a step of determining an alternative substance to the first substance, the one or more sensitive areas not being sensitive to the alternative substance.

11. The method of claim 1, wherein the one or more sensitive areas is located adjacent the field.

12. A method of adjusting a spraying system, comprising:
    electronically determining a current location of the spraying system on a field, the spraying system configured to spray a first substance;
    electronically determining a separation between one or more sensitive areas located in or adjacent the field and the current location of the spraying system on the field, the one or more sensitive areas being determined based on a type of the first substance in relation to a known adversity of at least one of a plant, an animal, a fungus and a bacterium to the first substance; and
    providing an indication indicative of a first one of the one or more sensitive areas being within a first distance from the current location, the indication being one of a visual indication, an audio indication, and a tactile indication.

13. The method of claim 12, wherein the current location may be determined by Global Positioning System (GPS).

14. The method of claim 12, wherein adjusting the spraying system may include one or more of changing the speed of the spraying system, changing the direction of the spraying system, altering the droplet size of the spraying system, or changing the boom height of the spraying system.

15. The method of claim 12, the spraying system includes a log file to capture information related to the spraying system, wherein the log file captures one or more of the first substance being applied, a date, a current time, the current location of the spraying system, a location of a projected route, an amount of deviation from an actual route to the projected route, actions of a user, information regarding current weather, a location of the one or more sensitive areas, a proximity of the spraying system to the one or more sensitive areas, and a warning.

16. The method of claim 12, wherein the spraying system interfaces with a database to determine information related to the one or more sensitive areas.

17. The method of claim 12, wherein the one or more sensitive areas is located adjacent the field.

18. An apparatus for adjusting a spraying system, comprising:
    the spraying system to selectively spray one or more substances including a first substance; and
    a controller operatively coupled to the spraying system, the controller determines a current location of the spraying system on a field, the controller determines a separation of the spraying system from a first sensitive area, the controller adjusts an output of the spraying system based on the current location and the separation of the spraying system from the first sensitive area, and the first sensitive area being identified based on a sensitivity of the first sensitive area to a type of the first substance in relation to a known adversity of at least one of a plant, an animal, a fungus and a bacterium to the first substance.

19. The apparatus of claim 18, wherein the spraying system interfaces with a database to determine information related to the first sensitive area.

20. The apparatus of claim 18, wherein the current location is determined by Global Positioning System (GPS).

21. The apparatus of claim 18, wherein the first sensitive area is located adjacent the field.

22. A method of providing instructions for a spraying system on a field, comprising:

receiving a first input regarding a potential application of one or more substances to locations proximate to one or more sensitive areas located in or adjacent the field, the first input including at least a temporal identification of the potential application, and a type of the one or more substances to be applied to the locations proximate to the one or more sensitive areas, the one or more sensitive areas being identified based on a sensitivity to the type of the one or more substances in relation to a known adversity of at least one of a plant, an animal, a fungus and a bacterium to the one or more substances;

receiving a second input from a database to determine information related to the one or more sensitive areas, the second input including a location of the one or more sensitive areas;

determining a separation between the location of the one or more sensitive areas and a current location of the spraying system on the field;

determining instructions for the potential application of the one or more substances to the locations proximate to the one or more sensitive areas;

generating the instructions for use by the spraying system on the field; and adjusting the instructions in response to the current location of the spraying system on the field being within a first distance from the location of a first one of the one or more sensitive areas.

23. The method of claim 22, wherein the input regarding the potential application includes at least one or more spraying system parameters.

24. The method of claim 23, wherein the one or more spraying system parameters includes droplet size, desired pressure, or drift reduction technology credits.

25. The method of claim 22, wherein the instructions are electronically provided to the spraying system.

26. The method of claim 22, wherein the instructions are provided to a user to operate the spraying system.

27. The method of claim 26, wherein the instructions provided to the user to operate the spraying system are transmitted to a handheld device operable by the user.

28. The method of claim 22, wherein the spraying system includes a log file to capture information related to the spraying system.

29. The method of claim 28, wherein the log file captures deviations from the generated instructions.

30. The method of claim 28, wherein the log file is electronically transmitted to a system.

31. The method of claim 22, wherein the one or more sensitive areas is located adjacent the field.

* * * * *